United States Patent [19]
Inoue et al.

[11] Patent Number: 5,822,008
[45] Date of Patent: Oct. 13, 1998

[54] SCAN CONVERSION APPARATUS WITH IMPROVED VERTICAL RESOLUTION AND FLICKER REDUCTION APPARATUS

[75] Inventors: Sadayuki Inoue; Naotoshi Maeda; Junji Sukeno; Hiroshi Onishi, all of Tokyo, Japan

[73] Assignee: Mitsubishi Denki Kabushiki Kaisha, Tokyo, Japan

[21] Appl. No.: 673,378

[22] Filed: Jun. 28, 1996

[30] Foreign Application Priority Data

Jun. 30, 1995 [JP] Japan .................................. 7-166093
Jan. 8, 1996 [JP] Japan .................................. 8-000785

[51] Int. Cl.⁶ ........................................................ H04N 7/01
[52] U.S. Cl. .......................... 348/446; 348/447; 348/910
[58] Field of Search ..................................... 348/447, 910, 348/448, 443, 445, 704, 561, 562, 446; H04N 7/01

[56] References Cited

U.S. PATENT DOCUMENTS

| | | | |
|---|---|---|---|
| 4,539,592 | 9/1985 | Tanaka et al. | 348/448 |
| 4,673,978 | 6/1987 | Dischert et al. | 348/448 |
| 4,677,483 | 6/1987 | Dischert et al. | 348/448 |
| 5,136,385 | 8/1992 | Campbell . | |
| 5,276,515 | 1/1994 | Katsumata et al. | 348/704 |
| 5,283,651 | 2/1994 | Ishizuka | 348/704 |
| 5,402,186 | 3/1995 | Kawai | 348/448 |
| 5,469,217 | 11/1995 | Ibental et al. | 348/447 |
| 5,534,935 | 7/1996 | Kawai et al. | 348/448 |

FOREIGN PATENT DOCUMENTS 795490  4/1995  Japan .

*Primary Examiner*—Michael Lee
*Attorney, Agent, or Firm*—Birch, Stewart, Kolasch & Birch, LLP

[57] ABSTRACT

A video scan converter has a deflickering circuit that attenuates spatial frequency components that combine high vertical spatial frequency with low horizontal spatial frequency. The resulting signal is converted from progressive scanning to interlaced scanning by appropriate selection of even and odd horizontal scanning lines. The deflickering circuit may also expand a selected part of the video signal by vertical interpolation, followed by vertical low-pass filtering, in which case a separate horizontal interpolating circuit expands the selected part horizontally, preferably after progressive-to-interlaced scan conversion.

40 Claims, 25 Drawing Sheets

SCAN CONVERSION APPARATUS WITH IMPROVED VERTICAL RESOLUTION AND FLICKER REDUCTION APPARATUS

BACKGROUND OF THE INVENTION

The present invention relates to a scan conversion apparatus for converting a progressively scanned video signal to an interlaced video signal.

Progressive scanning is employed in computer monitors, while interlaced scanning is employed in television sets, so the above type of scan conversion is needed when an image output from a computer is displayed on a television screen. This is expected to become a common situation, for the following reason.

The market for personal computers is expanding rapidly worldwide, but most personal computers have been purchased, either by firms or by individuals, as business tools. Recently, many manufacturers have been making personal computers easier to use by combining the computer and its keyboard, pointing device, monitor display, disk drives, and other components into a single unit, so that the user does not have to interconnect these components himself, and by adding pre-installed software. These personal computers are not intended for family use, however, but for use by a single individual, who sits facing a comparatively small display screen and manipulates the keyboard and pointing device by himself. The need for inexpensive, easy-to-operate computers for family use remains unanswered.

When computers are developed for family use, they will require a large display that can be watched by the whole family at once, with audio that can be heard by the whole family at once. That is, the display will have to be similar to a television display. The computer will also have to be operable like a television set or other home audio-visual appliance, by means of a wireless remote-control device, for example.

Providing an inexpensive display for such a computer presents a problem, because for a given size, a computer monitor is about four times as costly as a television display. The most readily available solution to this problem is to connect the computer to a television set through a device that converts the computer's progressive scanning to the interlaced scanning used by the television set. Thus as the personal computer evolves into a computer for family use, it can be anticipated that computer output will frequently be displayed on television screens, necessarily with scan conversion.

There is no single computer-display standard, but the video graphics array (VGA) standard is widely used and can be taken as a typical example. The VGA standard specifies progressive scanning with six hundred forty effective picture elements or pixels per horizontal scanning line, and four hundred eighty effective horizontal scanning lines per frame. The scanning rate is not standardized but is usually about sixty frames per second or sixty hertz (60 Hz).

There is also no single television standard, but recommendation BT.601 (system 525) of the Radiocommunication Sector of the International Telecommunications Union (ITU-R) can be taken as typical. This standard specifies seven hundred twenty effective pixels per horizontal scanning line at a sampling rate of 13.5 megahertz (13.5 MHz), with four hundred eighty-six effective scanning lines per frame. In television broadcasts each frame is divided into two interlaced fields, containing the even-numbered and odd-numbered scanning lines, respectively, and the scanning rate is about sixty fields per second. In the standard set by the National Television System Committee (NTSC), the scanning rate is 59.94 fields per second (59.94 Hz).

One reason for a frame rate in progressive scanning and a field rate in interlaced scanning of about sixty hertz is that this is the rate at which flicker ceases to be annoying in the range of brightness levels normally displayed on a computer monitor or television screen.

Since the computer's progressively-scanned frame rate is substantially equal to the interlaced field rate of the television set, scan conversion can be carried out basically by decimation: by deleting even-numbered scanning lines from one frame, odd-numbered scanning lines from the next frame, and so on in alternation. This leads to a severe flicker problem, however, because computer-generated images tend to contain many sharp edges and other fine detail. After scan conversion, detail within a vertical extent of only one scanning line will appear only in every other field, flickering at a rate of about thirty hertz. If the detail is bright, this flicker will be highly visible and irritating. Any sharp vertical brightness transition produces similar flicker.

A known method of reducing the flicker caused by the scan conversion of a computer-generated image is to use a low-pass spatial filter to reject the highest vertical spatial frequencies. For example, a filter that replaces each horizontal scanning line with the weighted average of that scanning line itself (given a weight of ½) and the adjacent scanning lines above and below (each given a weight of ¼) can effectively eliminate flicker.

A problem is that while eliminating flicker, this filter also reduces the vertical resolution of the image, so that vertical details become blurred. In particular, computer-generated text often becomes difficult to read. There are known methods of improving vertical resolution by reducing the degree of filtering in areas where little vertical high-frequency energy is present, or where image motion is present, but these methods fail to improve the readability of text, which is has considerable vertical high-frequency energy and is motionless.

Attempts have been made to compensate for the loss of vertical resolution by expanding images in which text or other important detail occurs. One known method of expanding an image copies part of the input signal to, for example, the odd field of the output signal, and constructs the even field by mean-value interpolation between adjacent odd-numbered scanning lines. After scan conversion by this method, however, odd-numbered fields appear sharper than even-numbered fields, because the odd fields are obtained directly from the original image while the even fields are obtained by averaging. Thus the entire screen appears to flicker.

Another known expansion method copies the original image to both the even and odd fields of the output image, so that the even and odd fields are identical. Both fields then appear equally sharp, but severe flicker occurs at horizontal edges in the output image.

SUMMARY OF THE INVENTION

It is accordingly a general object of the present invention to reduce flicker without unnecessary loss of vertical resolution, when a video signal is converted from progressive scanning to interlaced scanning.

A more specific object is to improve the legibility of text in a video signal that has been converted from progressive scanning to interlaced scanning.

A further object is to avoid flicker when an image is expanded in the process of conversion from progressive scanning to interlaced scanning.

The invented scan conversion apparatus has a deflickering circuit that attenuates spatial frequency components having high vertical spatial frequency and simultaneously having low horizontal spatial frequency, thereby producing a filtered video signal. Selected horizontal scanning lines of the filtered video signal are stored in a frame memory, which has separate areas for storing even and odd horizontal scanning lines, thereby converting the filtered video signal from progressive scanning to interlaced scanning.

The deflickering circuit comprises a combination of at least two of the following elements: a vertical filtering circuit for separating high vertical spatial frequencies from low vertical spatial frequencies and outputting at least the low vertical spatial frequencies; a horizontal filtering circuit for separating high horizontal spatial frequencies from low horizontal spatial frequencies and outputting at least the high horizontal spatial frequencies; an amplitude limiter for limiting the amplitude of high vertical spatial frequencies, or of high-vertical-low-horizontal spatial frequencies; a direct-current detector for detecting direct-current-like portions of the input video signal and controlling the operation of the amplitude limiter; and an amplitude converter for modifying the amplitude of spatial frequencies that are high in both the horizontal and vertical directions.

The deflickering circuit may also be adapted to expand part of the input video signal by vertical interpolation, followed by vertical low-pass filtering. In this case a separate horizontal interpolating circuit expands the selected parts horizontally by performing horizontal interpolation.

In the case of a color video signal, the deflickering circuit preferably operates only on the luminance component.

DETAILED DESCRIPTION OF THE PREFERRED EMBODIMENTS

Embodiments of the invention will be described with reference to the attached illustrative drawings. These embodiments will be described as converting a VGA video signal output by a computer to a video signal conforming to the standard set by the National Television System Committee (NTSC) for display by a television set, except that the luminance and chrominance components of the NTSC signal will be left separate.

Before the embodiments are described, it will be useful to give a more technical description of the way in which flicker arises.

Figure 1:
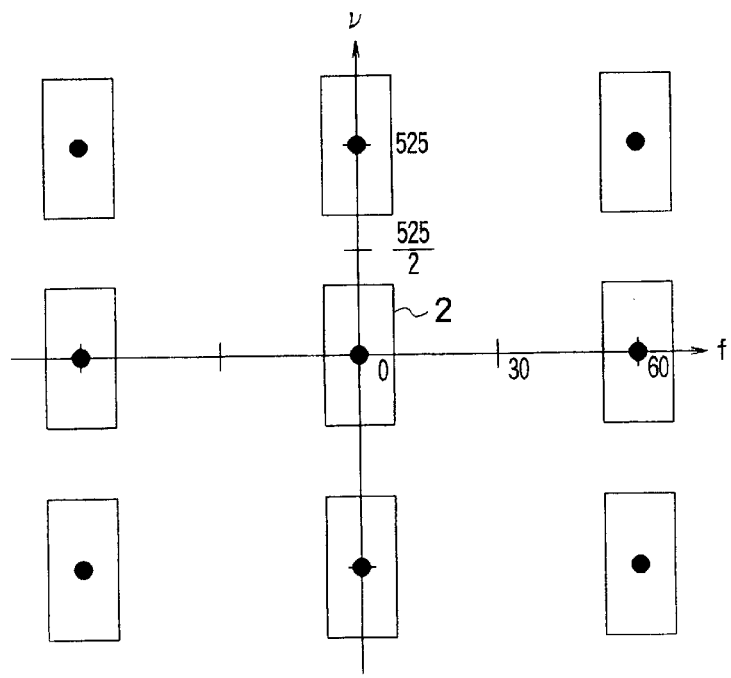
FIG. 1 illustrates vertical and temporal frequency characteristics of a progressively scanned video signal.

The frequency characteristics of a video signal can be described by a three-dimensional Fourier transform performed in relation to two spatial axes and one temporal axis. FIG. 1 illustrates the vertical and temporal frequency characteristics of a progressively scanned video signal having a frame rate of 60 Hz and a resolution of 525 horizontal scanning lines per frame, including scanning lines in the vertical blanking interval, which are not displayed. The vertical axis indicates vertical spatial frequency (v), which can be measured in cycles per height of the screen (cpH). The horizontal axis indicates temporal frequency, measured in hertz. The frequency components of a progressively scanned video signal appear repeatedly around multiples of 60 Hz in the temporal direction and multiples of 525 cpH in the vertical direction, in regions such as region 2.

The negative frequency values in FIG. 1 have essentially the same meaning as the positive frequency values. The frequency components corresponding to vertical fine detail are disposed at both the top and bottom of region 2 and the other regions.

Figure 2:
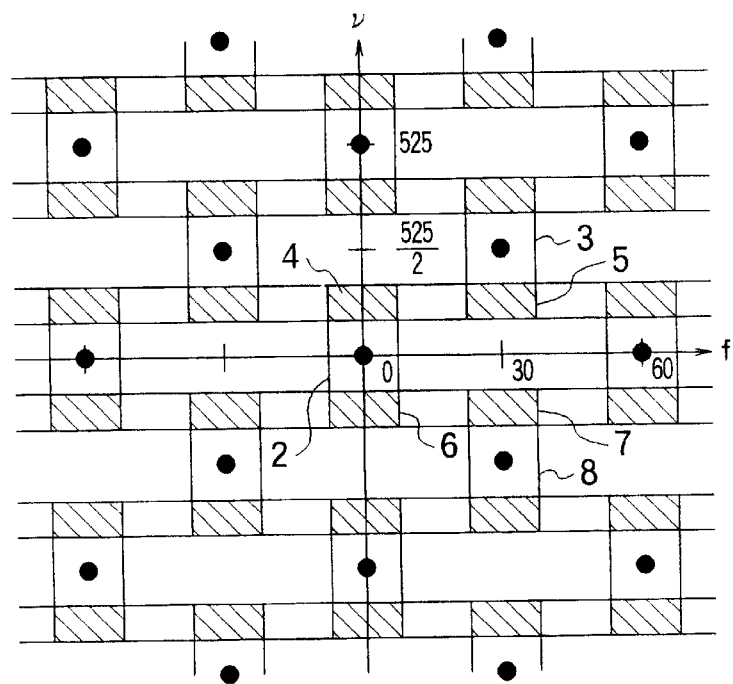
FIG. 2 illustrates vertical and temporal frequency characteristics of an interlaced video signal.

FIG. 2 illustrates the frequency characteristics of the signal in FIG. 1 after conversion from progressive to interlaced scanning. The horizontal and vertical axes have the same meaning as in FIG. 1. In addition to the frequency components 2 that were present in FIG. 1, new frequency components 3 are present, located around odd multiples of 30 Hz and 525/2 cpH. The vertical spatial frequencies that give rise to flicker occur in the hatched regions, e.g. where the highest positive vertical spatial frequencies 4 in region 2 coincide with negative vertical spatial frequencies 5 in region 3, or where the highest negative spatial frequencies 6 in region 2 coincide with positive spatial frequencies 7 in region 8.

Figure 3:
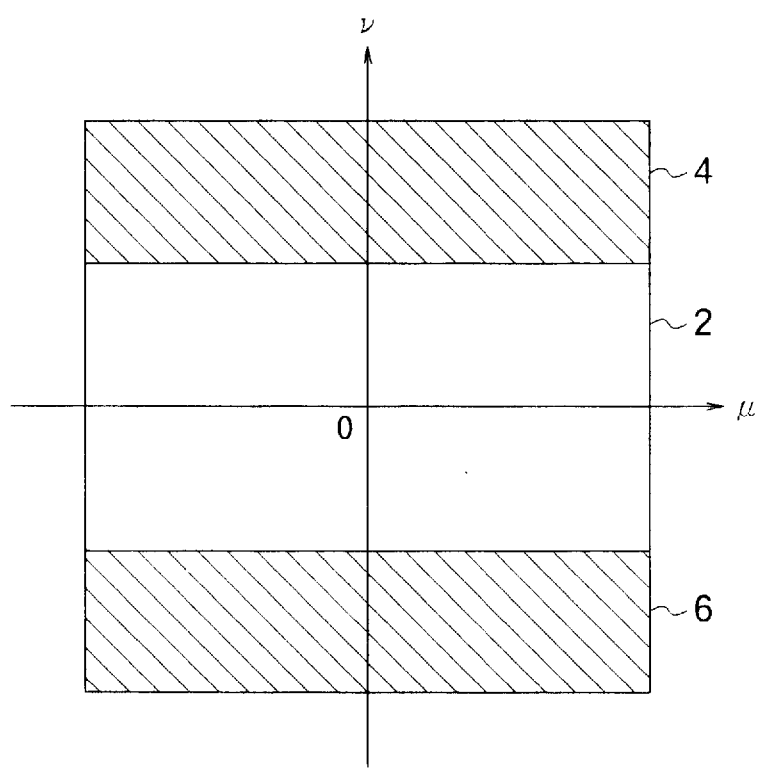
FIG. 3 illustrates vertical and horizontal frequency characteristics of a video signal.

FIG. 3 shows region 2 in FIG. 2 viewed in the spatial frequency plane. The vertical axis indicates vertical spatial frequency (v) as in FIG. 2. The horizontal axis now indicates horizontal spatial frequency ($u$), which is conventionally measured in megahertz. Hatching is again used to indicate the frequency components that give rise to flicker. If the frequency components in areas 4 and 6 are eliminated, the flicker disappears, but vertical resolution suffers, as noted earlier.

The embodiments of the present invention will filter out, limit, or attenuate some but not all of the frequency components in regions 4 and 6, thereby reducing flicker to an unobtrusive level while maintaining adequate vertical spatial resolution. The degree of filtering, limiting, or attenuation will be responsive to horizontal spatial frequency characteristics of the video signal.

First Embodiment

Figure 4:
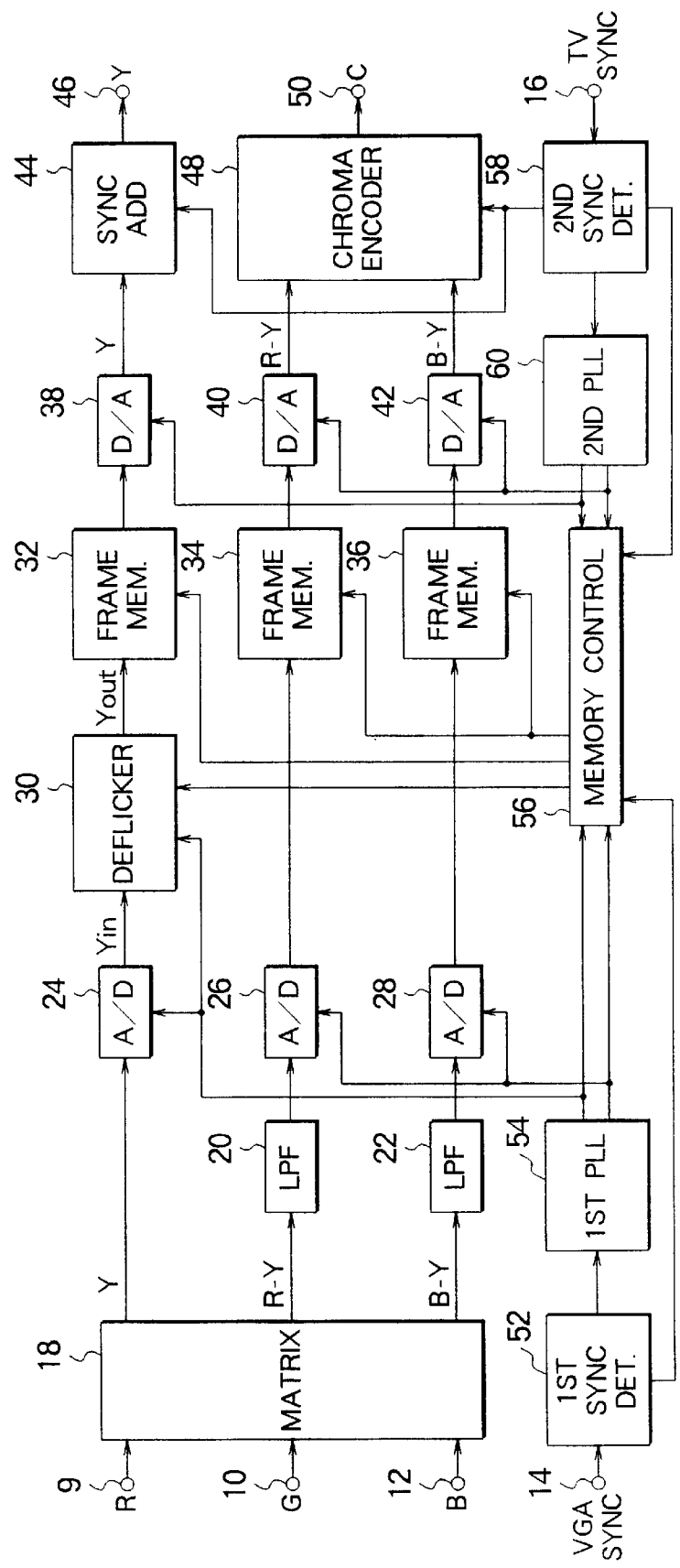
FIG. 4 is a block diagram illustrating the first seven embodiments of the invention.

FIG. 4 shows the general structure of the first embodiment. The VGA signal comprises separate red, green, and blue component signals (R, G, and B) which are received at input terminals 9, 10, and 12, and a synchronizing signal (VGA SYNC) that is received at an input terminal 14. The television set also provides a synchronizing signal (TV SYNC) to an input terminal 16.

The red, green, and blue component signals are supplied to a matrix circuit 18, which converts them to analog luminance and chrominance signals, more specifically to an analog luminance signal Y and two analog color difference signals R-Y and B-Y. The color difference signals are filtered by a pair of low-pass filters 20 and 22. The luminance signal Y and the filtered color difference signals R-Y and B-Y are then converted to digital signals by three analog-to-digital (A/D) converters 24, 26, and 28.

The digitized luminance signal (denoted Yin) is fed through a novel deflickering circuit 30, and the resulting filtered luminance signal (denoted Yout) is stored in a first frame memory 32. The digitized color difference signals R-Y and B-Y are stored in a pair of chrominance frame memories 34 and 36. At appropriate times, these signals are read out of the frame memories 32, 34, and 36 and converted to analog signals by three digital-to-analog (D/A) converters 38, 40, and 42. The resulting analog luminance signal Y is fed through a synchronizing signal adding circuit 44, which adds synchronizing pulses, to an output terminal 46. The analog color difference signals R-Y and B-Y are supplied to a chroma encoder 48, which combines them into a chrominance signal C that is delivered to an output terminal 50.

The VGA synchronizing signal is detected by a first synchronization detector 52, which furnishes horizontal and vertical synchronizing pulses to a first phase-locked loop (PLL) circuit 54 and a memory control circuit 56. The first PLL circuit 54 provides clock signals to the A/D converters 24, 26, and 28, the deflickering circuit 30, and the memory control circuit 56.

The TV synchronizing signal is detected by a second synchronization detector 58, which furnishes horizontal and vertical synchronizing pulses to the synchronizing signal adding circuit 44, the chroma encoder 48, a second PLL circuit 60, and the memory control circuit 56. The second PLL circuit 60 provides clock signals to the D/A converters 38, 40, and 42 and the memory control circuit 56.

Figure 5:
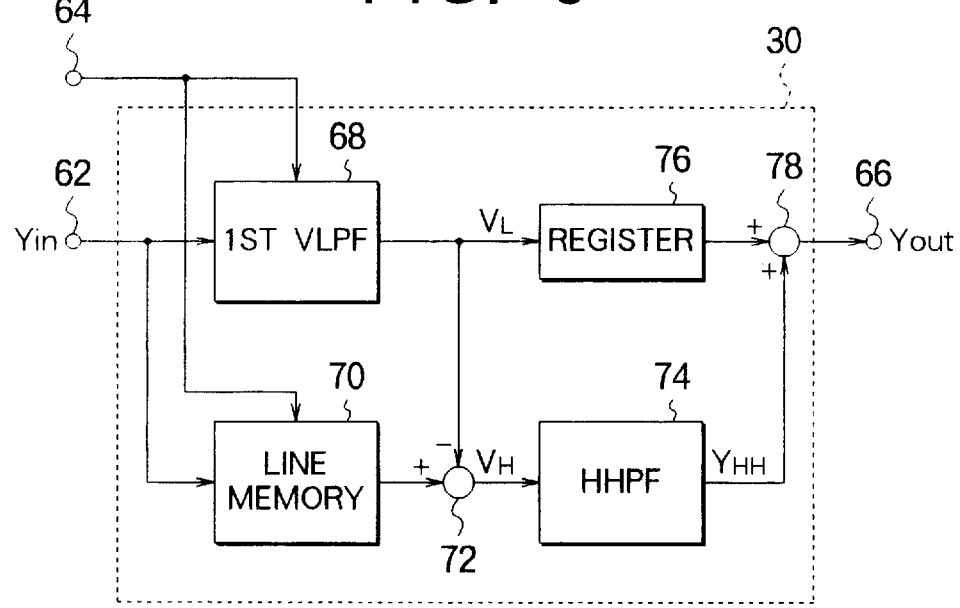
FIG. 5 is a block diagram of the deflickering circuit in the first embodiment of the invention.

FIG. 5 shows the structure of the novel deflickering circuit 30 in FIG. 4. This deflickering circuit 30 receives the digitized luminance signal Yin from A/D converter 24 at an input terminal 62, receives memory control signals from the memory control circuit 56 at an input terminal 64, and supplies a filtered luminance signal Yout to an output terminal 66, which is coupled to the first frame memory 32. The two input terminals 62 and 64 are coupled to a first vertical low-pass filter (VLPF) 68 and a line memory 70. The outputs of the first vertical low-pass filter 68 and line memory 70 are supplied to a subtractor 72, which furnishes their difference to a horizontal high-pass filter (HHPF) 74. The output of the first vertical low-pass filter 68 is stored temporarily in a register 76. An adder 78 adds the register contents to the output of the horizontal high-pass filter 74 and supplies the sum to the output terminal 66.

The symbol $V_L$ in FIG. 5 indicates the vertical low-frequency luminance signal $V_L$ (containing luminance components with low vertical spatial frequencies) output by the first vertical low-pass filter 68. $V_H$ indicates the vertical high-frequency luminance signal (containing luminance components with high vertical spatial frequencies) obtained by subtracting $V_L$ from Yin. $Y_{HH}$ indicates the horizontal-high-frequency-vertical-high-frequency signal obtained by horizontal high-pass filtering of $V_H$.

In the following description it will be assumed that all of these signals are eight-bit signals. The possible values of Yin and $V_L$ are from zero and two hundred fifty-five (0 to 255). The possible values of $V_H$ and $Y_{HH}$ are from minus one hundred twenty-seven to plus one hundred twenty-eight (−127 to 128).

Figure 6:
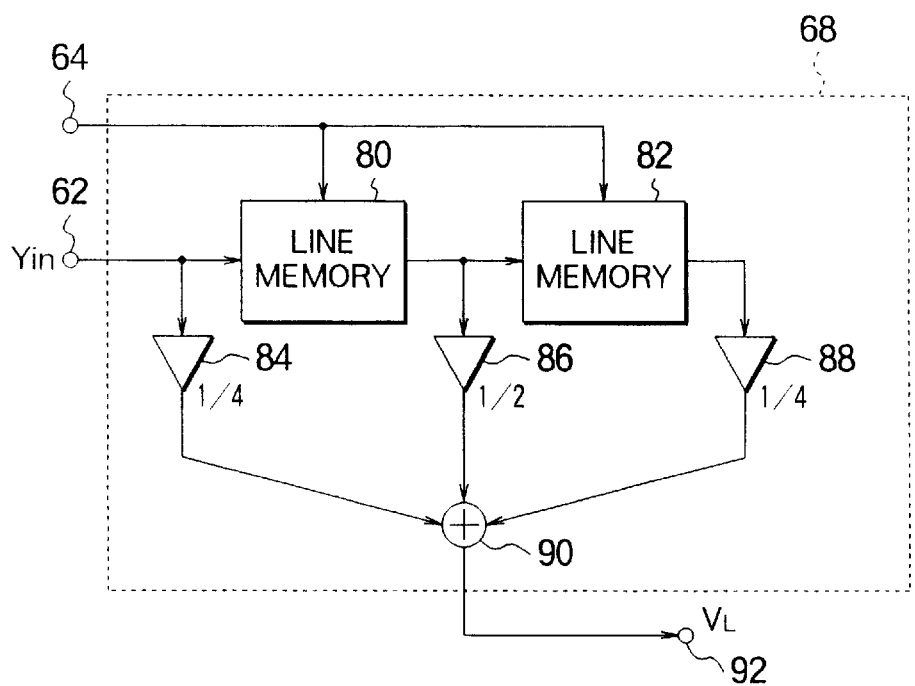
FIG. 6 is a block diagram of the vertical low-pass filter in FIG. 5.

FIG. 6 shows the structure of the first vertical low-pass filter 68 in FIG. 5. This filter has three taps, with coefficients of ¼, ½, and ¼. More specifically, the luminance signal Yin received at input terminal 62 is stored in a first line memory 80, then passed from the first line memory 80 to a second line memory 82. These line memories 80 and 82 are controlled by the memory control signals received at input terminal 64. The input to line memory 80, the output from line memory 80, and the output from line memory 82 are furnished to respective multipliers 84, 86, and 88, and multiplied by respective weighting coefficients (tap coefficients) of ¼, ½, and ¼. The outputs of multipliers 84, 86, and 88 are added by an adder 90 and provided as the vertical low-frequency luminance signal $V_L$ to an output terminal 92.

Figure 7:
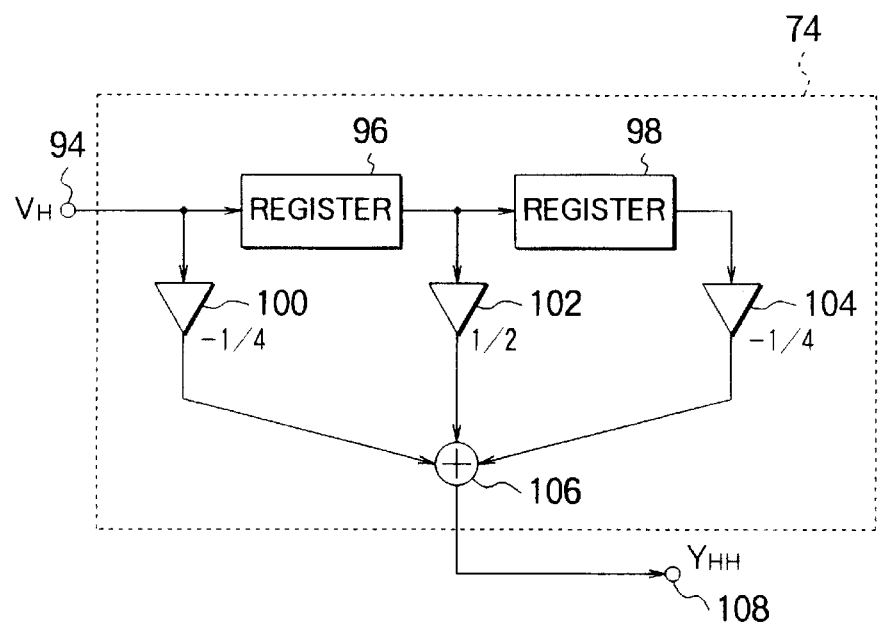
FIG. 7 is a block diagram of the horizontal high-pass filter in FIG. 5.

FIG. 7 shows the structure of the horizontal high-pass filter 74 in FIG. 5. The vertical high-frequency signal $V_H$ is received at an input terminal 94, stored in a first register 96, then passed to a second register 98. The input to register 96, the output from register 96, and the output from register 98 are furnished to respective multipliers 100, 102, and 104, and multiplied by respective weighting coefficients of −¼, ½, and −¼. The outputs of multipliers 100, 102, and 104 are added by an adder 106 and provided as the horizontal-high-frequency-vertical-high-frequency signal $Y_{HH}$ to an output terminal 108.

As FIGS. 5, 6, and 7 indicate, the hardware requirements of the deflickering circuit 30 are modest, consisting in all of three registers, three line memories, three adders, six multipliers, and a subtractor. The multipliers are particularly simple. Since the multipliers multiply by fixed coefficients of ½, ¼, or −¼, they need only perform a one- or two-bit right shift operation, or a two-bit right shift and a two's complement operation. The right shift operations can be carried out simply by means of appropriate signal line interconnections.

Figure 8:
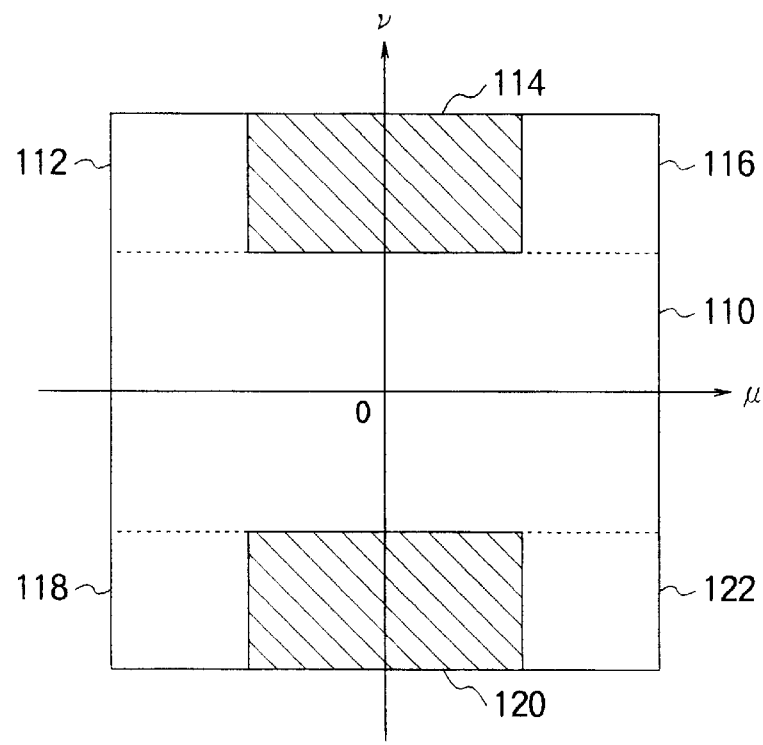
FIG. 8 is a spatial frequency diagram illustrating the operation of the first embodiment.

FIG. 8 shows the two-dimensional spatial frequency plane again and illustrates the basic operating concept of the deflickering circuit 30. The horizontal and vertical axes have the same meaning as in FIG. 3.

Generally speaking, flicker occurring over a large area is much more noticeable than flicker occurring in a small area. When a large area flickers, not only is the flicker obvious, but the human eye extends the perception of flicker into adjacent areas, so that those areas appear to flicker too. Thus if the horizontal dividing lines or top and bottom boundary lines in a table or chart flicker, the flicker is extremely irritating; the entire table or chart appears to vibrate. If only the very short horizontal lines occurring in the letters of text in the table or chart flicker, however, the flicker will be barely perceptible and will not cause irritation.

The first embodiment accordingly separates vertical spatial frequency components that cause obvious flicker from components that cause less perceptible flicker, and removes only components that cause obvious flicker. More precisely, first all flicker-causing components are removed, then those components that cause less perceptible flicker are added back in. The vertical resolution in areas of small-scale detail, such as areas of text, is thereby restored sufficiently for the detail to be seen, e.g. for the text to be read.

In FIG. 8, first the high vertical spatial frequencies in regions 112, 114, 116, 118, 120, and 122 are removed from the luminance signal. Then the components in regions 112, 116, 118, and 122, representing high-vertical-high-horizontal spatial frequencies, are added back in. Thus only the components in regions 114 and 120, which combine high vertical spatial frequency with low horizontal spatial frequency, are removed.

Next the operation of the first embodiment will be described with reference to FIGS. 4 to 7. Details of the internal operation of the matrix circuit 18 and other well-known circuits will be omitted.

Referring to FIG. 4, after the red, green, and blue component signals received at input terminals 9, 10, and 12 have been converted by the matrix circuit 18 to a luminance signal Y and color difference signals R-Y and B-Y, the low-pass filters 20 and 22 limit the bandwidth of the color difference signals R-Y and B-Y to half the bandwidth output by the matrix circuit 18. This band limitation has little effect on final picture quality, because the human eye is less sensitive to chrominance detail than to luminance detail. Because of this band limitation, the sampling clock signal supplied from the first PLL circuit 54 to A/D converters 26 and 28 has half the rate of the sampling clock signal supplied to A/D converter 24. The data rate of each of the digitized color difference signals R-Y and B-Y is therefore half the data rate of the digitized luminance signal Yin.

The first PLL circuit 54 generates these sampling clock signals from the horizontal synchronizing pulses detected by the first synchronization detector 52. The sampling clock supplied to A/D converters 26 and 28 is obtained by dividing the frequency of the sampling clock supplied to A/D converter 24. Both sampling clocks are supplied to the memory control circuit 56. The sampling clock supplied to A/D converter 24, referred to below as the VGA dot clock, is also supplied to the deflickering circuit 30. In addition, the first synchronization detector 52 supplies both horizontal and vertical synchronizing signals to the memory control circuit 56.

The memory control circuit 56 uses the VGA horizontal synchronizing signal supplied from the first synchronization detector 52 to generate read and write control signals for the line memories 70, 80, and 82 in the deflickering circuit 30 and its first vertical low-pass filter 68. These line memories are, for example, first-in-first-out (FIFO) memory circuits to which the memory control circuit 56 supplies line address reset signals for read access and write access, read and write enable signals, and read and write clock signals. The memory control circuit 56 also uses both the VGA horizontal and vertical synchronizing signals supplied from the first synchronization detector 52 to generate read and write control signals for the frame memories 32, 34, and 36, as will be described later.

Referring to FIG. 5, the digitized luminance signal Yin output from A/D converter 24 is received at input terminal 62 of the deflickering circuit 30, fed to the first vertical low-pass filter 68 and line memory 70, and processed as follows.

Referring to FIG. 6, the luminance signal Yin is supplied to the first line memory 80 and multiplier 84 in the first vertical low-pass filter 68. The first line memory 80 outputs the luminance signal Yin with a delay of one horizontal scanning line to the second line memory 82 and multiplier 86. The second line memory 82 outputs the luminance signal Yin with a delay of one more horizontal scanning line to multiplier 88. Line memories 80 and 82 receive the above-mentioned read and write control signals from the memory control circuit 56 at input terminal 64.

When a luminance pixel is output from the first line memory 80 and multiplied by ½ in multiplier 86, the luminance pixels directly above and below are simultaneously multiplied by ¼ in multipliers 84 and 88. By taking the sum of these three products, adder 90 rejects the flicker-causing high vertical spatial frequencies, leaving the vertical low-frequency luminance signal $V_L$ with only lower vertical spatial frequencies. $V_L$ can be considered to be delayed by one horizontal scanning line with respect to Yin.

When a pixel value is output from the first line memory 80, multiplied by ½ in multiplier 86, and added by adder 90, the read and write control signals received from the memory control circuit 56 at input terminal 64 cause the line memory 70 in FIG. 5 to output the same pixel value. Subtractor 72 therefore subtracts the low-pass filtered value of each pixel from the unfiltered value of the same pixel. In this way all the low vertical spatial frequencies that were left by the first vertical low-pass filter 68 are removed by subtractor 72, leaving only high vertical spatial frequencies in the output $V_H$ of subtractor 72.

Referring to FIG. 7, this vertical high-frequency signal $V_H$ is received by the horizontal high-pass filter 74 at input terminal 94 and supplied to the first register 96 and multiplier 100 in the horizontal high-pass filter 74. The first register 96 outputs $V_H$ with a delay of one pixel to the second register 98 and multiplier 102. The second register 98 outputs $V_H$ with a delay of one more pixel to multiplier 104. Registers 96 and 98 are controlled by the VGA dot clock output by the first PLL circuit 54, although this is not explicitly indicated in the drawing.

When a $V_H$ pixel value is output from the first register 96 and multiplied by ½ in multiplier 102, the values of the adjacent pixels to the right and left are simultaneously multiplied by −¼ in multipliers 100 and 104. By taking the sum of these three products, adder 106 rejects low horizontal spatial frequencies. Since the input $V_H$ to the horizontal high-pass filter 74 contained only high vertical spatial frequencies, the output YHH of the horizontal high-pass filter 74 contains only components which are high in both horizontal and vertical spatial frequency simultaneously (regions 112, 116, 118, and 122 in FIG. 8). $Y_{HH}$ can be considered to be delayed by one pixel with respect to $V_H$ and $V_L$.

Referring again to FIG. 5, register 76 delays $V_L$ by one pixel, so that adder 78 adds each pixel in $V_L$ to the corresponding $Y_{HH}$ pixel. The filtered luminance signal Yout output by adder 78 is delayed by one scanning line plus one pixel, and contains both the low vertical spatial frequencies present in $V_L$ and the high vertical, high horizontal spatial frequencies present in $Y_{HH}$. In FIG. 8, this signal Yout contains all components except those in the hatched regions 114 and 120.

Referring again to FIG. 4, the filtered luminance signal Yout output by the deflickering circuit 30 and the color difference signals R-Y and B-Y output by A/D converters 26 and 28 are stored in the frame memories 32, 34, and 36 in accordance with write control signals received from the memory control circuit 56, as follows.

The control signals furnished from the memory control circuit 56 to the frame memories 32, 34, and 36 are adapted to convert a progressively scanned digital video signal input at a frame rate of 60 Hz to an interlaced digital video signal output at a field rate of 60 Hz. The conversion from frame structure to field structure takes place when the signal is written into the frame memories.

The memory control circuit 56 generates control signals as follows. Upon receiving a VGA vertical synchronizing signal from the first synchronization detector 52, the memory control circuit 56 decides whether the video data that follow will become an even field or an odd field. This decision can be made by having each VGA vertical synchronizing signal toggle an even/odd flag. If the decision is an odd field, the memory control circuit 56 generates control signals to write the odd-numbered scanning lines into the frame memories 32, 34, and 36. If the decision is an even field, the memory control circuit 56 generates control signals to write the even-numbered scanning lines into the frame memories 32, 34, and 36. The memory control circuit 56 differentiates between even- and odd-numbered lines by counting the VGA horizontal synchronizing signals received from the first synchronization detector 52.

The frame memories 32, 34, and 36 therefore receive and store the digital video data in an interlaced sequence: first odd-numbered scanning lines, then even-numbered scanning lines, then odd-numbered scanning lines, and so on. Each frame memory 32, 34, and 36 has separates areas for storing two fields of digital video data, an even field and an odd field. One of the control signals output from the memory control circuit 56, which can be generated from the above-mentioned even/odd flag, switches between these two fields. The memory control circuit 56 also provides address signals and write enable signals, which are generated from the horizontal and vertical synchronizing signals received from the first synchronization detector 52 and the clock signals received from the first PLL circuit 54. Only the values of pixels in the VGA picture area are stored in the frame memories; values in the horizontal and vertical blanking intervals are not stored.

From the television synchronizing signal received at input terminal 16, the second synchronization detector 58 detects horizontal and vertical synchronizing signals, decides whether the field following each vertical synchronizing signal is an even or odd field, and generates an even/odd field decision signal. From the horizontal synchronizing signals detected by the second synchronization detector 58, the second PLL circuit 60 generates luminance and chrominance clock signals, the chrominance clock having half the frequency of the luminance clock. The luminance clock is supplied to D/A converter 38. The chrominance clock is supplied to D/A converters 40 and 42. Both clocks are supplied to the memory control circuit 56, together with the horizontal and vertical synchronizing signals and even/odd field decision signal from the second synchronization detector 58. The second synchronization detector 58 also sends the horizontal and vertical synchronizing signals and even/odd field decision signal to the synchronizing signal adding circuit 44 and chroma encoder 48.

Using the horizontal and vertical synchronizing signals and even/odd field decision signal received from the second synchronization detector 58, and the clock signals received from the second PLL circuit 60, the memory control circuit 56 generates read control signals for the frame memories 32, 34, and 36. These read control signals include address signals, read enable signals, and signals that select the even or odd field of stored video data. In response to these signals, the frame memories 32, 34, and 36 output the stored digital video data in an interlaced scanning sequence.

The D/A converters 38, 40, and 42 convert the interlaced digital video signals output from the frame memories 32, 34, and 36 to interlaced analog video signals. To the interlaced analog luminance signal Y output by D/A converter 38, the synchronizing signal adding circuit 44 adds horizontal and vertical synchronizing pulses generated from the horizontal and vertical synchronizing signals and even/odd field decision signal received from the second synchronization detector 58. The synchronizing signal adding circuit 44 also inserts additional signal segments as necessary in the horizontal and vertical blanking intervals.

The chroma encoder 48 uses the analog color difference signals R-Y and B-Y received from D/A converters 40 and 42 to modulate a color subcarrier signal, thereby creating the output chrominance signal C. The modulation is performed in synchronization with the horizontal and vertical synchronizing signals and even/odd field decision signal received from the second synchronization detector 58.

The analog luminance and chrominance signals Y and C can be supplied from output terminals 46 and 50 directly to a television set, or if necessary, they can be combined into a composite video signal and supplied to the television set.

There are two reasons why the first step in the scan conversion process is to convert the VGA red, green, and blue component signals to the luminance signal Y and color difference signals R-Y and B-Y, rather than to operate directly on the red, green, and blue component signals.

The first reason concerns the ability of the human eye to detect flicker. The human visual sense is extremely sensitive to luminance flicker, but is not very sensitive to flicker occurring in the color difference signals. The inventors have carried out a computer simulation to evaluate the effect of removing flicker from the color difference signals, using the method employed in the deflickering circuit 30. It was found that the removal of flicker from the color difference signals was less noticeable than the attendant loss of vertical resolution. Removing flicker only from the luminance signal Y and not from the color difference signals R-Y and B-Y therefore helps to minimize the loss of vertical resolution in the scan conversion process, and the flicker remaining in the color difference signals has little effect on perceived picture quality. Furthermore, only one deflickering circuit 30 is required to remove flicker from the luminance signal Y, whereas three such circuits would be required to remove flicker from the VGA red, green, and blue component signals.

The second reason concerns the sensitivity of the human eye to the color difference signals themselves. The human visual sense is extremely sensitive to changes in the luminance signal Y, but is not very sensitive to changes in the color difference signals. Thus the human eye is unable to detect that the bandwidth of the color difference signals R-Y and B-Y has been cut in half by the low-pass filters 20 and 22. This reduction of bandwidth enables A/D converters 26 and 28 to operate at half the luminance sampling rate, so that only half as much color-difference data is generated, and frame memories 34 and 36 require only half as much capacity for storing the data. The total size and cost of the scan conversion circuit is thus significantly reduced. Power consumption is also reduced, because of the reduced chrominance clock rate.

The first embodiment reduces flicker by removing luminance signal components simultaneously having high vertical and low horizontal spatial frequencies, without removing other luminance components, and without removing any perceptible chrominance information. The result is to eliminate most perceived flicker while retaining sufficient vertical resolution for most sizes of text to be read, and much vertical detail to be seen. Computer simulation of the first embodiment shows that at a viewing distance equal to the height of the screen (1H), there is some perceptible flicker, at slanted edges of characters in text, for example, but the flicker is confined to small areas. At a viewing distance equal to three times the height of the screen (3H), the flicker becomes imperceptible.

The remaining flicker in the first embodiment comes from the horizontal-high-frequency-vertical-high-frequency signal $Y_{HH}$, so this remaining flicker can be reduced by attenuating the amplitude of the output of the horizontal high-pass filter 74. For example, the multipliers 100, 102, and 104 in FIG. 7 can be adapted to multiply by −⅛, ¼, and −⅛, thereby attenuating the output of the horizontal high-pass filter 74 by a factor of two. A separate amplitude converter can also be provided, as will be described in the fifth embodiment.

Second Embodiment

The second embodiment differs from the first only in the internal structure and operation of the deflickering circuit 30.

Figure 9:
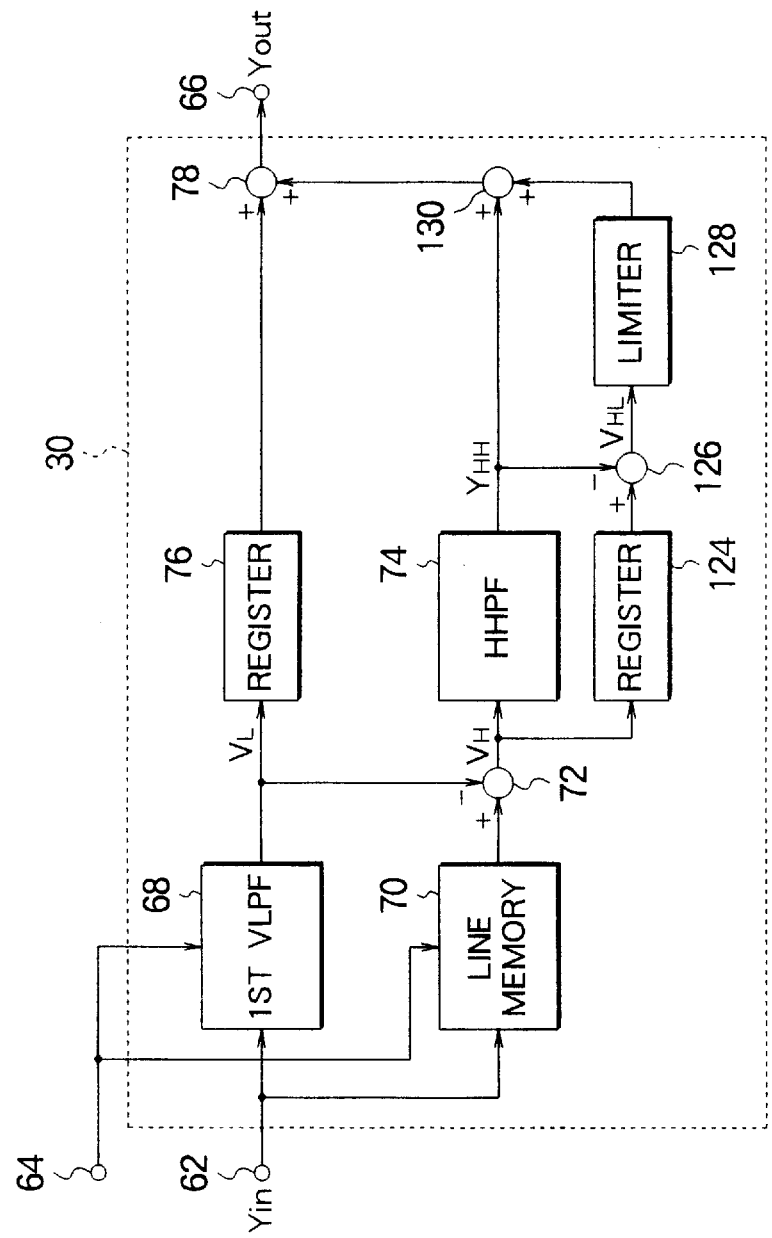
FIG. 9 is a block diagram of the deflickering circuit in the second embodiment.

FIG. 9 shows the deflickering circuit 30 in the second embodiment, using the same reference numerals as in FIG. 5 for identical elements. The new elements in the second embodiment are a register 124, a subtractor 126, an amplitude limiter 128, and an adder 130.

Figure 10:
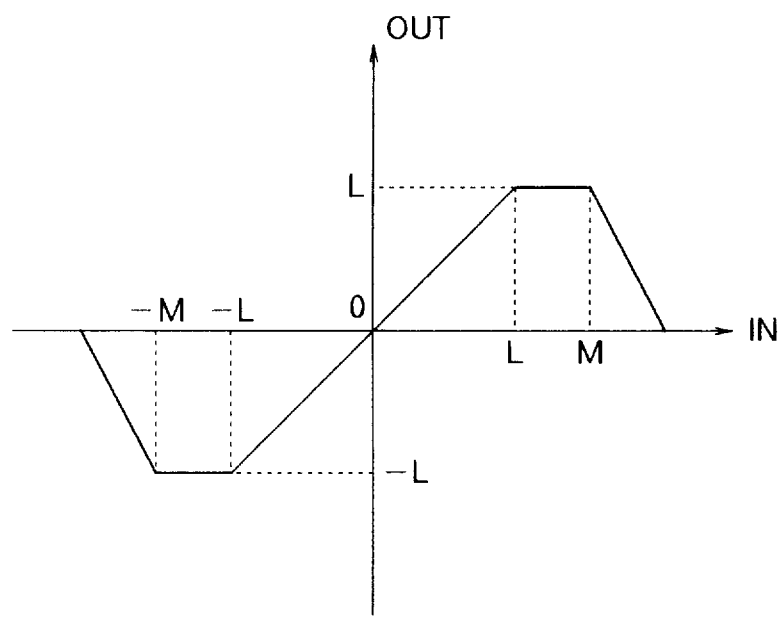
FIG. 10 illustrates the limiting characteristic of the amplitude limiter in FIG. 9.

FIG. 10 shows the input-output characteristic of the amplitude limiter 128, the horizontal axis representing input and the vertical axis representing output. For input values up to ±L, the output is identical to the input. For input values between ±L and ±M, the output remains constant at ±L. Beyond ±M, the output value decreases to zero. The output of the amplitude limiter 128 is thus limited to a maximum amplitude of ±L. Computer simulation indicates that if the value of the vertical high-frequency component $V_H$ output by adder 72 ranges from minus one hundred twenty-seven to plus one hundred twenty-eight, best results are obtained when L is between about ten and twenty.

The basic principle of the second embodiment is that the sensitivity of the human eye to flicker depends not only on the spatial extent of the flicker but also on the amplitude of the flicker. A video signal that flickers between black and white, for example, is much more irritating than one that flickers between two slightly different shades of gray. Thus even wide-area flicker can be tolerated up to a limited flicker amplitude.

Next the operation of the second embodiment will be described. The description will be confined to the operation of the deflickering circuit 30; other parts operate as in the first embodiment.

Referring again to FIG. 9, the vertical high-frequency signal $V_H$ output by adder 72 is input simultaneously to the horizontal high-pass filter 74 and register 124. As explained earlier, there is a delay equivalent to one pixel between the input and output of the horizontal high-pass filter 74. Operating in synchronization with the clock signal supplied from the first PLL circuit 54, register 124 delays $V_H$ by an equal one-pixel amount. Subtractor 126 subtracts the output of the horizontal high-pass filter 74 from the output of register 124, thereby subtracting from the vertical high-frequency signal $V_H$ those components that are also high in horizontal spatial frequency, and leaving the components that combine high vertical spatial frequency with low horizontal spatial frequency. The output of subtractor 126, denoted $V_H L$, corresponds to hatched regions 114 and 120 in FIG. 8.

The amplitude limiter 128 limits the output of subtractor 126 as indicated in FIG. 10, thereby limiting the line-to-line amplitude of luminance fluctuations in the vertical direction in areas combining high vertical spatial frequency with low horizontal spatial frequency. Adder 130 adds the output of the amplitude limiter 128 to the output of the horizontal high-pass filter 74, and supplies the resulting sum to adder 78, to be added to the output of register 76. The final output Yout of the deflickering circuit 30 accordingly contains all luminance features with low vertical spatial frequencies or high horizontal spatial frequencies, and also, though with limited amplitude, luminance features combining high vertical spatial frequency with low horizontal spatial frequency.

Compared with the first embodiment, the deflickering circuit 30 in the second embodiment allows more flicker to pass through, but as the additional flicker is confined to small amplitude levels, the flicker is not readily perceived. Moreover, vertical fine detail which would be lost in the first embodiment is preserved, although in a generally muted form, in the second embodiment.

Computer simulations indicate that the second embodiment gives results generally similar to the first embodiment, perceived flicker being confined to small areas such as the slanted parts of characters in text, and becoming imperceptible at a distance equal to three screen heights. There is a noticeable improvement, however, in the visibility of vertical detail and the legibility of text.

Figure 11:
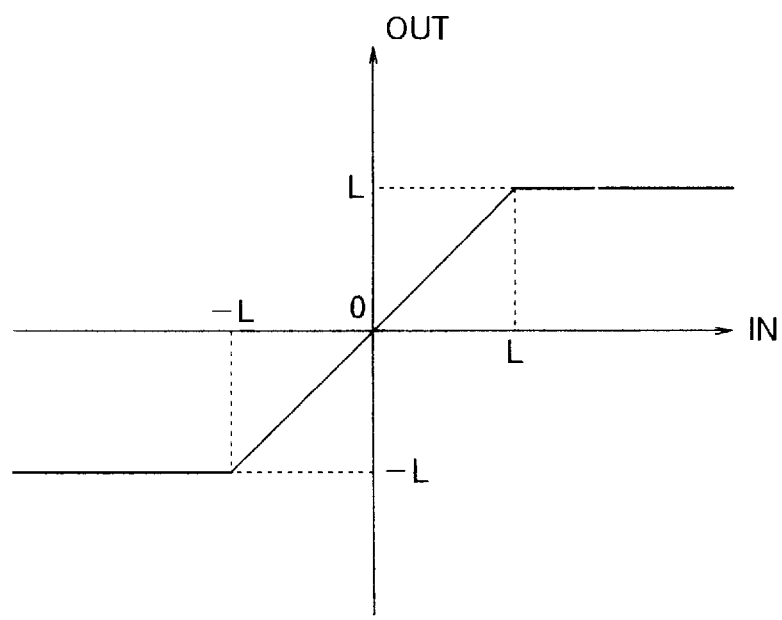
FIG. 11 illustrates a variation of the limiting characteristic of the amplitude limiter in FIG. 9.

The amplitude limiter 128 in the second embodiment is not restricted to the type of characteristic shown in FIG. 10. It may have, for example, the characteristic shown in FIG. 11, which simply limits the output to a maximum amplitude of ±L. Specifically, the output value is identical to the input value up to ±L, and remains constant at ±L when the input value exceeds ±L. Computer simulation indicates that the characteristic in FIG. 11 leads to slightly better vertical resolution than the characteristic in FIG. 10.

The amplitude limiter 128 may also be adapted to operate with a plurality of limiting characteristics, which can be selected by a control signal. The control signal may be provided from a manual control device, so that the user can adjust the flicker according to the viewing distance. Alternatively, the control signal may be provided from the computer that provides the input VGA video signal, allowing the computer to recognize the size of characters in the display and adjust the vertical resolution accordingly. Yet another alternative will be described in the fifth embodiment.

Third Embodiment

The third embodiment differs from the first embodiment only in the internal structure and operation of the deflickering circuit 30.

Figure 12:
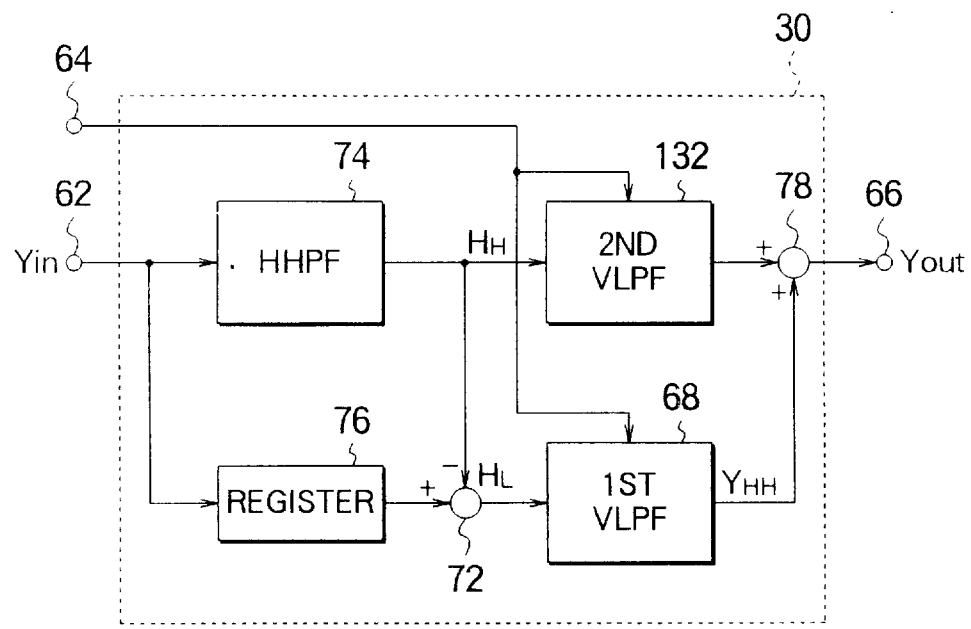
FIG. 12 is a block diagram of the deflickering circuit in the third embodiment.

FIG. 12 shows the deflickering circuit 30 in the third embodiment, using the same reference numerals as in FIG. 5 for identical elements. The first vertical low-pass filter 68 and horizontal high-pass filter 74 are the same as in the first embodiment, but their positions have been interchanged, and the position of register 76 has been moved accordingly. In addition, the line memory 70 of the first embodiment has been replaced by a second vertical low-pass filter 132.

The horizontal high-pass filter 74 produces a horizontal high-frequency signal $H_H$ containing signal components with high horizontal spatial frequency, irrespective of their vertical spatial frequencies. Subtractor 72 now subtracts $H_H$ from Yin to produce a horizontal low-frequency signal $H_L$ containing signal components with low horizontal spatial frequencies.

Figure 13:
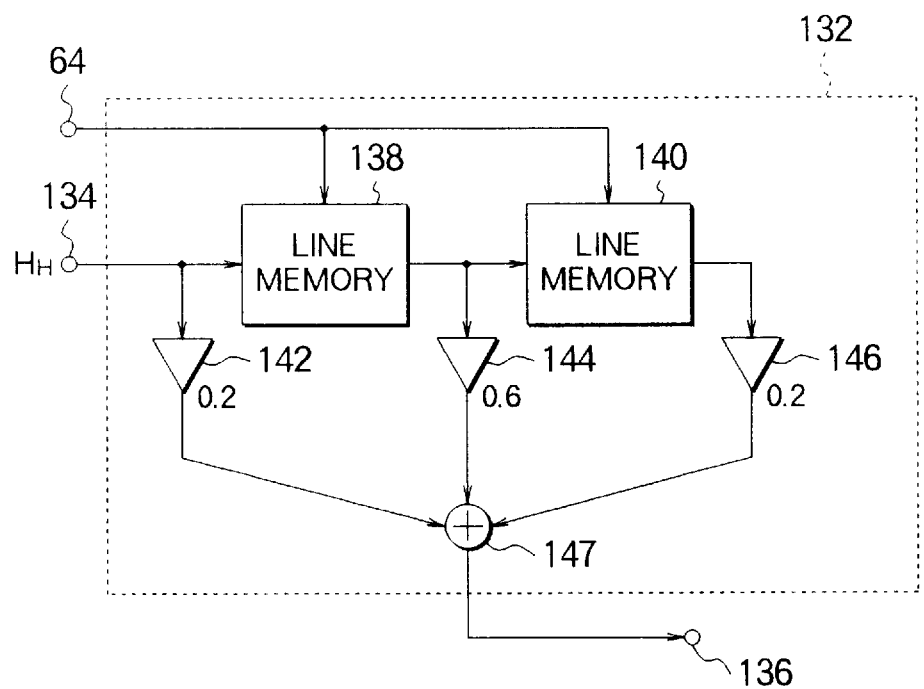
FIG. 13 is a block diagram of the second vertical low-pass filter in FIG. 12.

FIG. 13 shows the internal structure of the second vertical low-pass filter 132. The second vertical low-pass filter 132 has an input terminal 134 for receiving the horizontal high-frequency signal $H_H$, an output terminal 136 coupled to adder 78 in FIG. 12, two line memories 138 and 140 that delay $H_H$ by one line each, three multipliers 142, 144, and 146 that multiply the input and output of line memory 138 and the output of line memory 140 by factors of 0.2, 0.6, and 0.2, respectively, and an adder 147 that adds the outputs of multipliers 142, 144, and 146 and provides their sum to output terminal 136. The line memories 138 and 140 are controlled by signals received from the memory control circuit 56 at input terminal 64. As can be seen by comparing FIGS. 6 and 13, the structure of the second vertical low-pass filter 132 is the same as the structure of the first vertical low-pass filter 68 except for the values of the multiplier coefficients.

Figure 14:
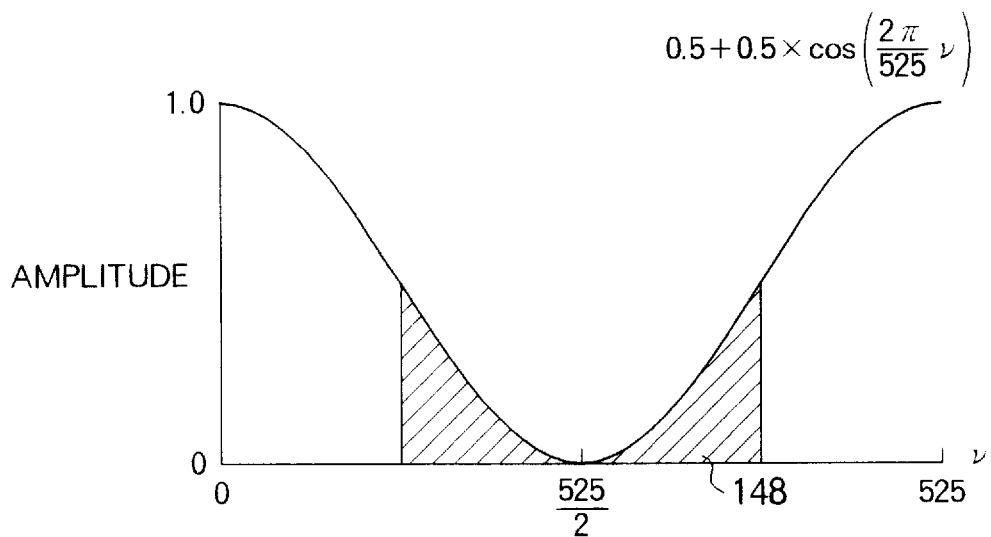
FIG. 14 illustrates the frequency characteristic of the first vertical low-pass filter in FIG. 12.

FIG. 14 shows the frequency characteristic of the first vertical low-pass filter 68, and the mathematical formula for this characteristic. The horizontal axis indicates vertical spatial frequency; the vertical axis indicates amplitude. Cross-hatching indicates the region 148 of remaining flicker. The first vertical low-pass filter 68 completely eliminates the vertical spatial frequency corresponding to 525/2 cpH in the center of this region 148, and strongly attenuates other spatial frequencies in region 148.

Figure 15:
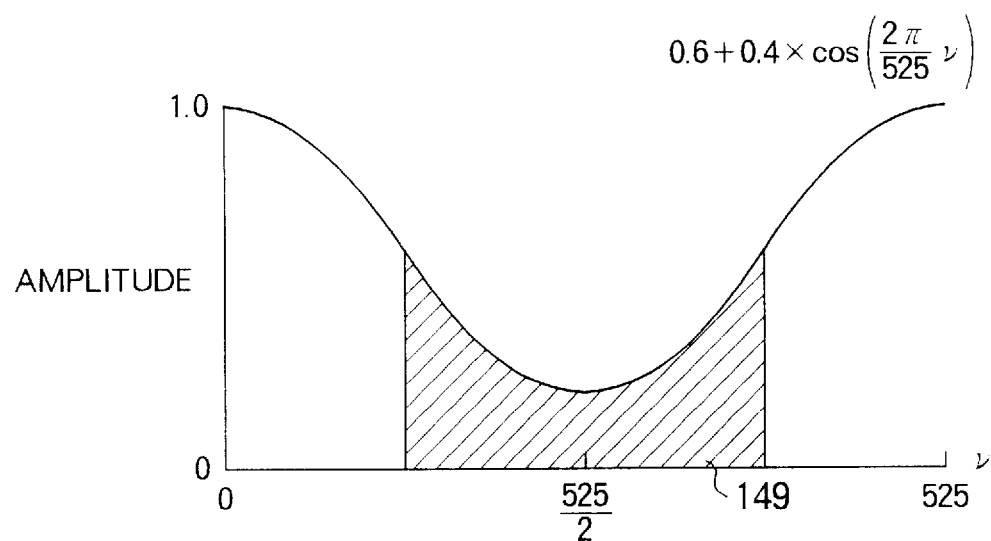
FIG. 15 illustrates the frequency characteristic of the second vertical low-pass filter in FIG. 12.

FIG. 15 shows the frequency characteristic of the second vertical low-pass filter 132, and the mathematical formula for this characteristic. The horizontal axis indicates vertical spatial frequency, and the vertical axis indicates amplitude. Cross-hatching again indicates the region of remaining flicker 149. This characteristic has the same general shape as the one in FIG. 14, but the second vertical low-pass filter 132 attenuates all vertical frequencies by a lesser amount than does the first vertical low-pass filter 68, and therefore reduces flicker less than does the first vertical low-pass filter 68.

Figure 16:
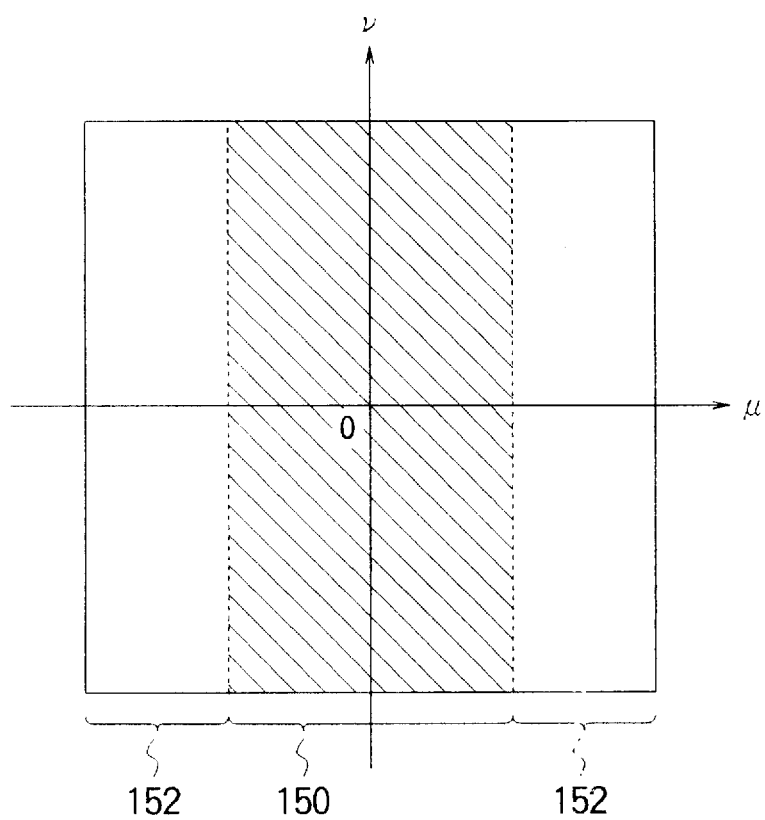
FIG. 16 is a spatial frequency diagram illustrating the operation of the third embodiment.

FIG. 16 shows the two-dimensional spatial frequency plane and illustrates the principle of operation of the third embodiment. The horizontal and vertical axes the same meaning as in FIG. 3. The hatched area 150 represents features with low horizontal spatial frequencies. If these features flicker, the flicker occurs over a horizontally wide area, so the flicker is obvious and irritating. The non-hatched area 152 represents features with high horizontal spatial frequencies, in which flicker is less perceptible.

The third embodiment reduces flicker in both areas 150 and 152, but with different vertical low-pass filters, so that flicker is reduced more in area 150 than in area 152. The first vertical low-pass filter 68 is used to reduce the readily perceptible flicker in area 150. The second vertical low-pass filter 132 is used to reduce the less perceptible flicker in area 152. This arrangement enables perceptible flicker to be eliminated almost completely, while still retaining enough vertical resolution to show small vertical features.

Next the operation of the third embodiment will be described. The description will be confined to the operation of the deflickering circuit 30, since other elements operate as in the first embodiment.

Referring again to FIG. 12, the digital luminance signal Yin received at input terminal 62 is supplied to the horizontal high-pass filter 74 and register 76. The horizontal high-pass filter 74 rejects low horizontal spatial frequencies (area 150 in FIG. 16), and outputs the horizontal high-frequency signal $H_H$ (which contains the horizontal spatial frequencies in area 152 in FIG. 16) with a one-pixel delay. Register 76 provides an equivalent delay. Subtractor 72 subtracts the output of the horizontal high-pass filter 74 from the output of register 76 to produce the horizontal low-frequency signal $H_L$, which contains the frequency components in the hatched area 150 in FIG. 16.

These signals $H_L$ and $H_H$ are input to the first vertical low-pass filter 68 and second vertical low-pass filter 132, respectively. Operating as indicated by the frequency characteristics in FIGS. 14 and 15, the first vertical low-pass filter 68 strongly attenuates the high vertical spatial frequencies in the hatched region 150 in FIG. 16, while the second vertical low-pass filter 132 attenuates high vertical spatial frequencies in region 152 less strongly. Adder 78 adds the outputs of vertical low-pass filters 68 and 132 to produce the filtered luminance signal Yout supplied to output terminal 66.

Although the third embodiment performs horizontal high-pass filtering and vertical low-pass filtering in the reverse of the order in the first embodiment, the resulting attenuation of signal components combining high vertical spatial frequency with low horizontal spatial frequency is the same as in the first embodiment. Since the third embodiment also attenuates signal components with high vertical and high horizontal spatial frequencies, flicker is reduced to a greater extent than in the first embodiment; the small-scale flicker which remained in the first embodiment is substantially imperceptible in the third embodiment. Since the attenuation of high-vertical-high-horizontal spatial frequencies is less than the attenuation of high-vertical-low-horizontal spatial frequencies, however, more vertical resolution remains than if all high vertical spatial frequencies were filtered by the first vertical low-pass filter 68.

The third embodiment is not restricted to the frequency characteristics shown in FIGS. 14 and 15. These characteristics can be modified by altering the multiplier coefficients, for example, or providing additional filter taps (additional line memories and multipliers). Non-linear filters with amplitude limiters similar to the amplitude limiter 128 in the second embodiment can also be used. In general, any type of low-pass filter can be used, as long as the first vertical low-pass filter 68 attenuates high vertical spatial frequencies more strongly than does the second vertical low-pass filter 132.

The third embodiment can also be modified by dividing the two-dimensional spatial frequency plane into more than two regions. A pair of horizontal spatial filters can be used to obtain three signals with high, medium, and low horizontal spatial frequencies, for example, and a different vertical low-pass filter can be provided for each. The low horizontal spatial frequencies should then receive the strongest flicker attenuation, and the highest horizontal spatial frequencies should receive the least flicker attenuation.

Fourth Embodiment

The fourth embodiment also differs from the first embodiment only in the internal structure and operation of the deflickering circuit 30.

Figure 17:
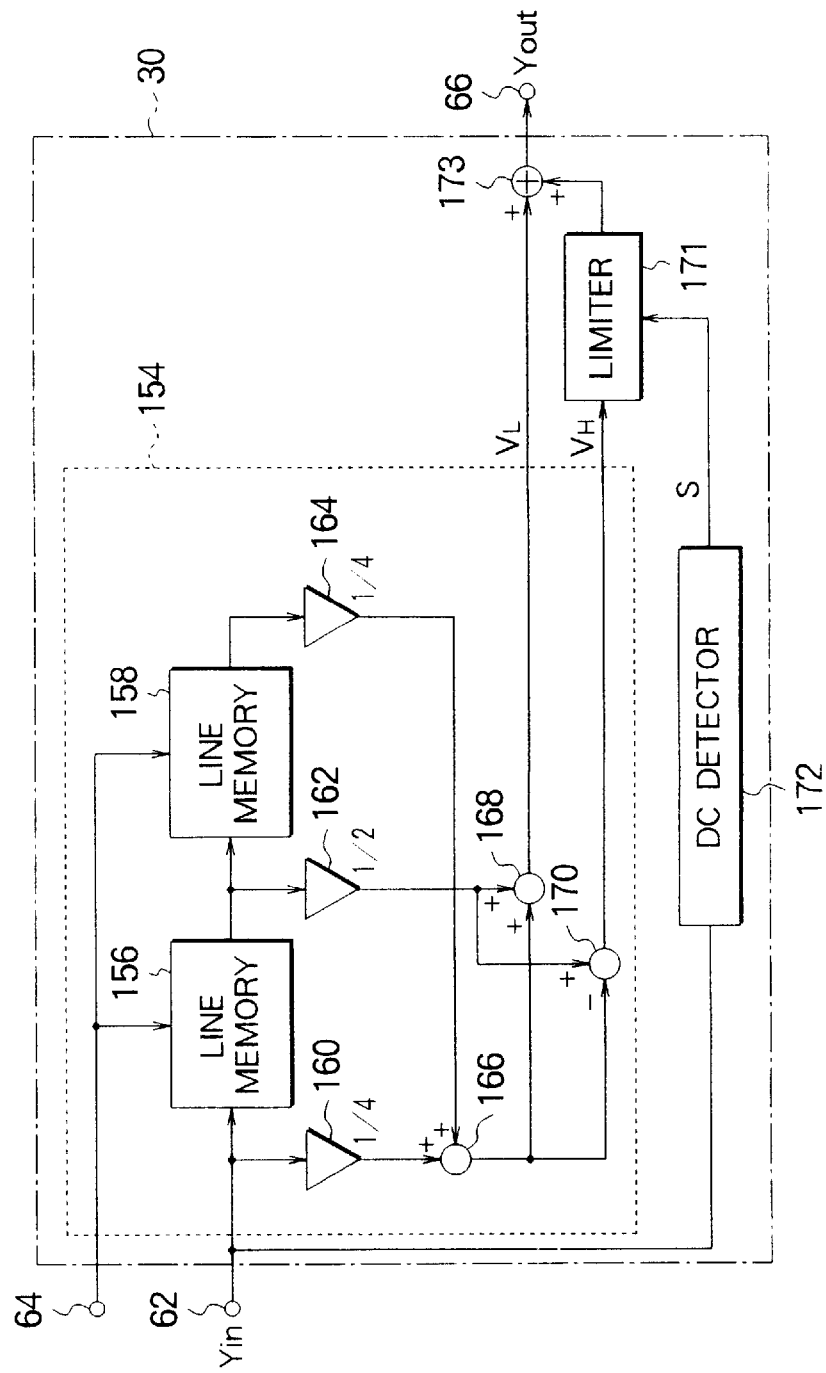
FIG. 17 is a block diagram of the deflickering circuit in the fourth embodiment.

FIG. 17 shows the deflickering circuit 30 in the fourth embodiment, using the same reference numerals as in FIG. 5 for the input and output terminals 62, 64, and 66. The deflickering circuit 30 in the fourth embodiment has a single vertical high-low separation filter 154 comprising two line memories 156 and 158, three multipliers 160, 162, and 164, two adders 166 and 168, and a subtractor 170. Subtractor 170 outputs a vertical high-frequency signal $V_H$ to an amplitude limiter 171, which is controlled by a direct-current detector 172. Adder 168 outputs a vertical low-frequency signal $V_L$ to another adder 173, which adds $V_L$ to the output of the amplitude limiter 171 and supplies the resulting filtered luminance signal Yout to output terminal 66.

Figure 18:
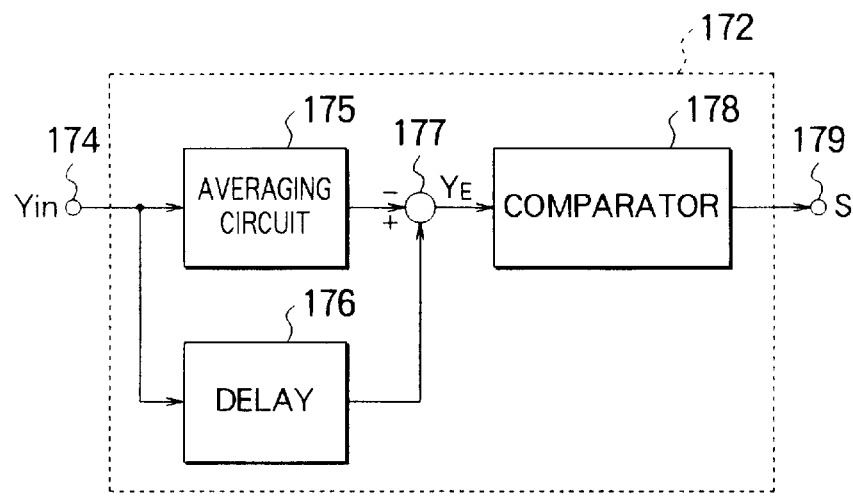
FIG. 18 is a block diagram of the direct-current detector in FIG. 17.

FIG. 18 shows the structure of the direct-current detector 172. The luminance signal Yin is received at an input terminal 174 and supplied to an averaging circuit 175 and a delay circuit 176. The averaging circuit 175 takes the average of the luminance signal Yin over a certain number of horizontally adjacent pixels. A subtractor 177 subtracts the average value obtained by the averaging circuit 175 from the output of the delay circuit 176 and outputs their difference $Y_E$ to a comparator 178 that generates a control signal S at an output terminal 179.

The fourth embodiment operates on the principle, mentioned earlier, that the human visual sense perceives high-amplitude flicker more readily than low-amplitude flicker. Perceived flicker in the fourth embodiment is accordingly reduced by limiting the amplitude of high-frequency vertical luminance fluctuations. In areas with only very low horizontal spatial frequencies, where the luminance level is substantially constant in the horizontal direction and flicker would be most noticeable, high-frequency vertical luminance fluctuations are not only limited but reduced to zero.

Areas of horizontally constant luminance level are areas in which, in each horizontal scanning line, the luminance signal has a direct-current or DC character. The term "DC-like" will be used below to mean "substantially constant in luminance level in the horizontal direction."

Next the operation of the deflickering circuit 30 in the fourth embodiment will be described. Other elements of the fourth embodiment operate as in the first embodiment.

Referring again to FIG. 17, the line memories 156 and 158 and multipliers 160, 162, and 164 operate in the same way as the line memories 80 and 82 and multipliers 84, 86, and 88 in the first vertical low-pass filter 68 of the preceding embodiments, shown in FIG. 6. The two adders 166 and 168 take the sum of the outputs of all three multipliers 160, 162, and 164, so the vertical low-frequency signal $V_L$ output by the vertical separation filter 154 in the fourth embodiment is identical to the vertical low-frequency signal $V_L$ output by the first vertical low-pass filter 68 in the first embodiment.

Subtractor 170 subtracts the sum of the outputs of multipliers 160 and 164 from the output of multiplier 162. The line memories 156 and 158, multipliers 160, 162, and 164, adder 166, and subtractor 170 function as a vertical high-pass filter in the same way that the registers 96 and 98, multipliers 100, 102, and 104, and adder 106 functioned as a horizontal high-pass filter in FIG. 7. The signal $V_H$ i output by subtractor 170 is complementary to the signal $V_L$ output by adder 168 in that if $V_H$ and $V_L$ are added together, the result is identical to the luminance signal Yin received at input terminal 62 (with a one-line delay). The vertical high-frequency signal $V_H$ output by the vertical separation filter 154 is therefore identical to the high-frequency signal $V_H$ obtained by the subtractor 72 in FIG. 5 in the first embodiment.

Referring to FIG. 18, the averaging circuit 175 takes the average of, for example, five consecutive samples of the luminance signal Yin. The delay circuit 176 delays Yin by a corresponding amount, three samples for example, so that the subtractor 177 obtains the difference between the average value obtained by the averaging circuit 175 and, preferably, the middle (e.g. third) sample value among the sample values averaged by the averaging circuit 175. The comparator 178 compares the absolute value of this difference $Y_E$ with a positive threshold value β, activates the control signal S at output terminal 179 when $-β ≦ Y_E ≦ β$, and de-activates S when $Y_E < -β$ or $β < Y_E$.

Control signal S will accordingly be active in those portions of a horizontal scanning line in which the luminance level is substantially constant, or is changing at a substantially constant rate.

The averaging circuit 175 is not limited to taking the average of five consecutive samples. Other numbers of samples can be used.

Figure 19:
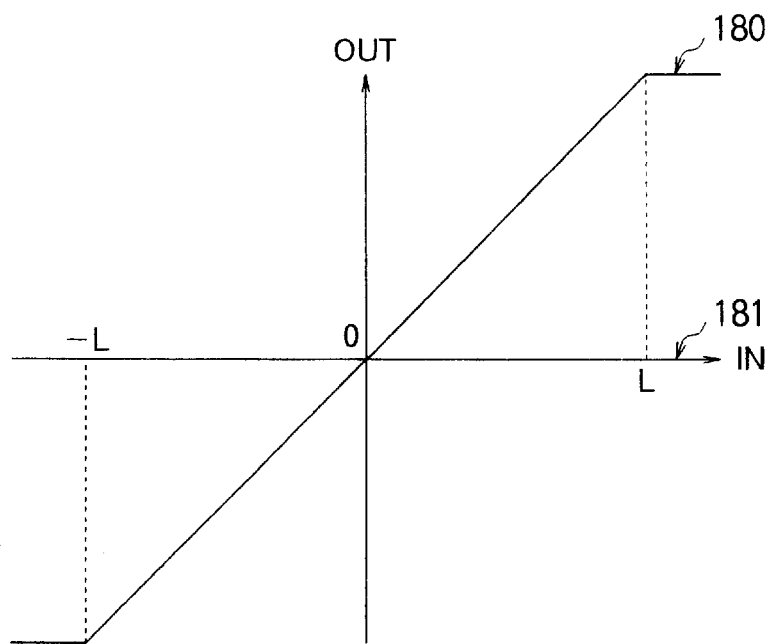
FIG. 19 illustrates the limiting characteristics of the amplitude limiter in FIG. 17.

FIG. 19 shows the input-output characteristics of the amplitude limiter 171, input being indicated on the horizontal axis and output on the vertical axis. The amplitude limiter 171 is adapted to operate with two input-output characteristics, which are selected by the control signal S from the direct-current detector 172.

The first characteristic 180, which is selected when the control signal S is inactive, is similar to the characteristic of the amplitude limiter 128 in the second embodiment, the output value being limited to the range between −L and +L and equal to the input value within that range.

The second characteristic 181, which is selected when the control signal S is active, limits the output value to zero, regardless of the input value.

By adding $V_L$ to the output of the amplitude limiter 171, adder 173 restores all frequency components of the luminance signal Y, except that the amplitude of luminance fluctuations having high vertical spatial frequency has been limited. Also, in areas with a flat luminance gradient in the horizontal direction, the vertical high-frequency signal $V_H$ is completely removed, instead of just being limited.

Compared with the second embodiment, the fourth embodiment reduces flicker to a lower level in areas of high horizontal spatial frequency by limiting the amplitude of $V_H$ in these areas (the second embodiment limited $V_H$ only in areas of low horizontal spatial frequency). One result is that the flicker at slanted edges of characters noted in the second embodiment is greatly reduced.

In areas of low horizontal spatial frequency, the fourth embodiment identifies the lowest horizontal spatial frequencies, which have DC-like characteristics, and reduces $V_H$ to zero in those areas. As a result, in other areas of low horizontal spatial frequency, the amplitude of $V_H$ does not have to be limited as severely as in the second embodiment. The value of the parameter L in the fourth embodiment can be higher than in the second embodiment, although L is still preferably in the range from about ten to about twenty.

In displays of charts and tables, the fourth embodiment reduces flicker more than the second embodiment does, both in areas of text, where $V_H$ is limited, and at horizontal dividing or boundary lines, by where $V_H$ is held to zero. This makes such displays easier to look at, although the text may appear fainter than in the second embodiment.

An advantage of the fourth embodiment, as compared with the second embodiment, is that it requires less hardware. The vertical separation filter 154 in the fourth embodiment is functionally equivalent to the combination of the first vertical low-pass filter 68, line memory 70, and subtractor 72 in the first embodiment. If compared with this combination, the vertical separation filter 154 can be seen to require one more subtractor but one less line memory. A subtractor, which only has to operate on two luminance values, has far fewer circuit elements than a line memory, which must store an entire scanning line of luminance values.

This advantage can be transferred to the first and second embodiments, and to other embodiments that follow, by substituting the vertical separation filter 154 of the fourth embodiment for the combination of the first vertical low-pass filter 68, line memory 70, and subtractor 72 in those other embodiments.

The fourth embodiment is not restricted to the pair of amplitude limiting characteristics illustrated in FIG. 19. Another pair of limiting characteristics which can be employed effectively will be described in the sixth embodiment. The amplitude limiter 171 may also operate with more than two limiting characteristics, which the comparator 178 can select by comparing the difference output by subtractor 177 with two or more threshold values.

Fifth Embodiment

The fifth embodiment also differs from the first embodiment only in the internal structure and operation of the deflickering circuit 30.

Figure 20:
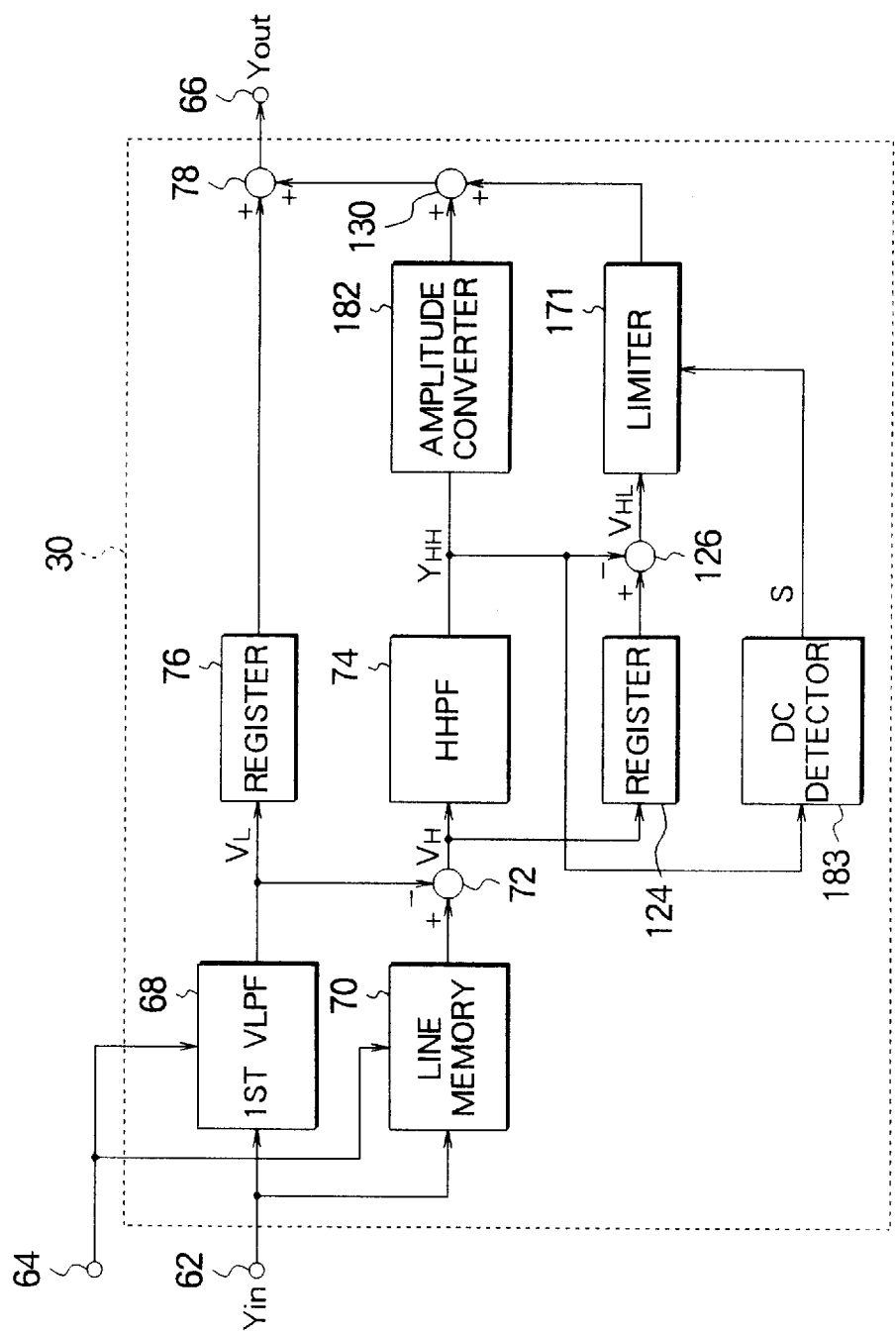
FIG. 20 is a block diagram of the deflickering circuit in the fifth embodiment.

FIG. 20 shows the deflickering circuit 30 in the fifth embodiment, using the same reference numerals as in FIG. 9 for elements that are the same as in the second embodiment. The additional elements in the fifth embodiment are the amplitude limiter 171 of the fourth embodiment, an amplitude converter 182 inserted between the horizontal high-pass filter 74 and adder 130, and a direct-current detector 183 that controls the amplitude limiter 171. The signals $V_L$, VH, YHH, and VHL have the same values as in the second embodiment.

Figure 21:
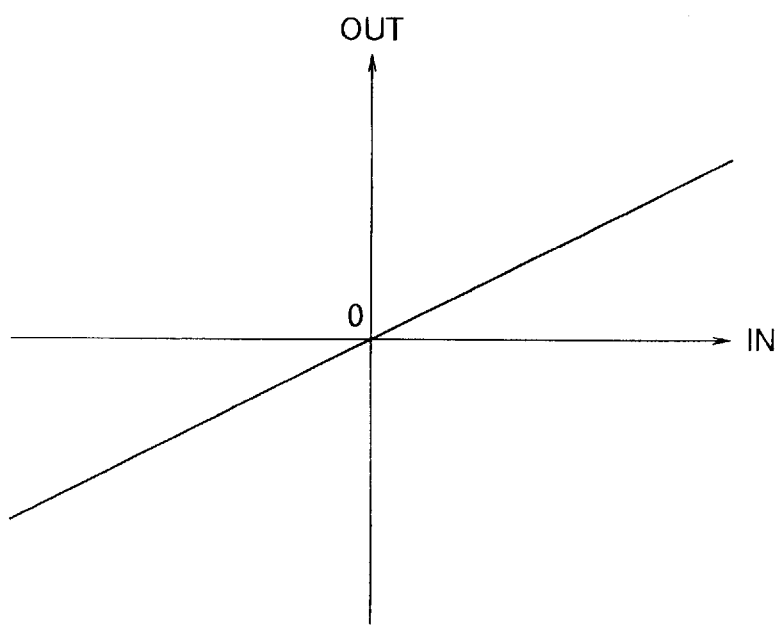
FIG. 21 illustrates the operating characteristic of the amplitude converter in FIG. 20.

FIG. 21 shows the input-output characteristic of the amplitude converter 182, input being indicated on the horizontal axis and output on the vertical axis. The amplitude converter 182 multiplies all input values by a constant value of 0.5, thereby reducing the amplitude of luminance fluctuations with high vertical and high horizontal spatial frequencies by one-half.

Next the operation of the deflickering circuit 30 in the fifth embodiment will be described with reference to FIGS. 20 and 21, omitting a description of the elements in the deflickering circuit 30 that operate in the same way as in the second and fourth embodiments. These elements include the first vertical low-pass filter 68, line memory 70, horizontal high-pass filter 74, registers 76 and 124, subtractor 72, adders 78 and 130, and limiter 171.

The output $Y_{HH}$ of the horizontal high-pass filter 74, representing luminance fluctuations with high horizontal and high vertical spatial frequency, is processed by the amplitude converter 182 so as to reduce the amplitude of these luminance fluctuations by a factor of 0.5, as indicated in FIG. 21. The effect is to make small-scale flicker less noticeable by reducing the amplitude of the flicker.

The output $Y_{HH}$ of the horizontal high-pass filter 74 is also supplied to the direct-current detector 183. The direct-current detector 183 compares $Y_{HH}$ with a fixed threshold value $\alpha$. If $-\alpha \leq Y_{HH} \leq \alpha$, the luminance signal Yin is considered to be of a DC nature in either the vertical or horizontal direction, and the control signal S is activated. If $Y_{HH} < -\alpha$, or if $\alpha < Y_{HH}$, the control signal S is made inactive. Computer simulations indicate that if $Y_{HH}$ varies from minus one hundred twenty-seven to plus one hundred twenty-eight, good results are obtained when $\alpha$ is between one and three.

The amplitude limiter 171 operates as in the fourth embodiment, limiting $V_H$ to a maximum amplitude of ±L when control signal S is inactive, and to zero when S is active. When the control signal S is active because Yin is substantially constant or DC-like in the vertical direction, $V_H$ is close to zero to begin with, so $V_{HL}$ is close to zero, and reducing $V_{HL}$ to zero has little noticeable effect. When the control signal S is active because Yin is substantially constant in the horizontal direction, reducing $V_{HL}$ to zero prevents the type of flicker that occurs at horizontal dividing lines in tables and charts, as in the fourth embodiment.

The filtered luminance signal Yout output by the deflickering circuit 30 in the fifth embodiment is similar to Yout in the fourth embodiment in that flicker reduction is applied to all high vertical spatial frequencies. The difference is that whereas the fourth embodiment used amplitude limiting in areas of high horizontal spatial frequency, the fifth embodiment employs amplitude attenuation by a constant factor of one-half. In text displays where there is a large difference between the luminance levels of the text and background, as when dark text is displayed on a light background or vice versa, the fifth embodiment reduces the luminance difference less than did the fourth embodiment, making the text more readable.

As a variation of the fifth embodiment, the amplitude converter 182 can employ a non-linear amplitude modification characteristic, instead of the linear characteristic shown in FIG. 21. As another variation, instead of reducing the $Y_{HH}$ amplitude, the amplitude converter 182 can increase the $Y_{HH}$ amplitude in order to enhance vertical resolution, although this will make small-scale flicker more noticeable. As yet another variation, the amplitude converter 182 can be provided with a plurality of amplitude modification characteristics, which can be selected by the user or by the computer according to picture content. For example, the amplitude converter 182 can be adapted to multiply the $Y_{HH}$ values by two in order to enhance vertical resolution, by one-half in order to reduce flicker, or by unity when neither of these effects is required.

Variations in the amplitude limiter 171 and direct-current detector 183 are also possible. The amplitude limiter 171 can be provided with more than two limiting characteristics, which are selected by the direct-current detector 183 by comparing $Y_{HH}$ with a plurality of threshold values. To speed up the comparison process, instead of comparing $Y_{HH}$ with positive and negative threshold limits (e.g. with $-\alpha$ and $\alpha$ as described above), the direct-current detector 183 can take the absolute value of $Y_{HH}$ ($|Y_{HH}|$) and compare $|Y_{HH}|$ only with positive threshold values (e.g. $\alpha$).

The direct-current detector 183 may also detect horizontally DC-like signals by testing the luminance signal Yin received at input terminal 62, as in the fourth embodiment, or by testing the vertical high-frequency signal $V_H$ output from subtractor 72, instead of testing $Y_{HH}$. The condition by which DC-like signals are detected may be more complex than simple comparison with a threshold value. The direct-current detector 183 may be a microcontroller or other computing device programmed to test such more complex conditions.

Sixth Embodiment

The sixth embodiment also differs from the first embodiment only in the internal structure and operation of the deflickering circuit 30.

Figure 22:
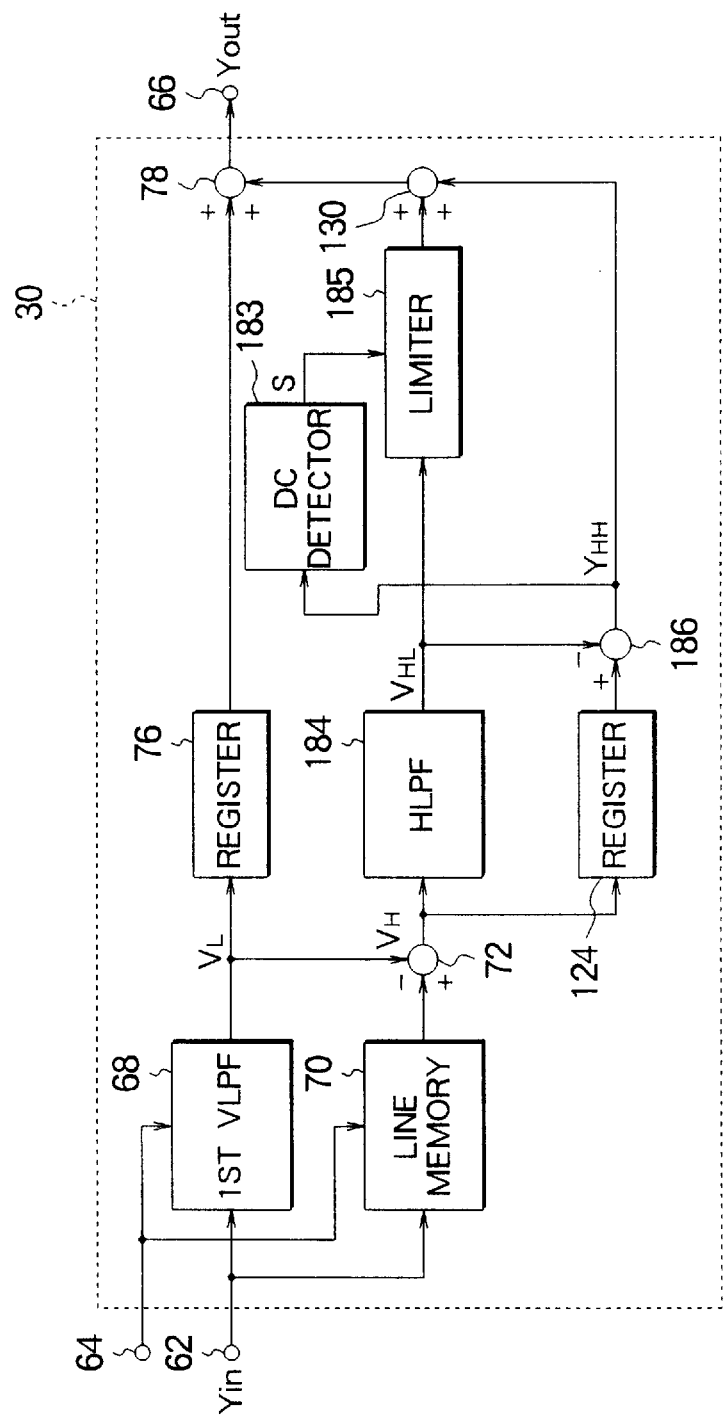
FIG. 22 is a block diagram of the deflickering circuit in the sixth embodiment.

FIG. 22 shows the deflickering circuit 30 in the sixth embodiment, using the same reference numerals as in FIG. 20 to denote elements corresponding to elements in the fifth embodiment. The sixth embodiment differs from the fifth embodiment in that the deflickering circuit 30 has no amplitude converter 182, the horizontal high-pass filter 74 of the fifth embodiment is replaced by a horizontal low-pass filter 184, and the amplitude limiter 185 operates differently from the amplitude limiter 171 in the fifth embodiment.

Although the preceding embodiments reject frequency components in areas 114 and 120 in FIG. 8, the rejection is not complete. The first vertical low-pass filter 68 has the characteristic shown in FIG. 14, which permits flicker-causing vertical spatial frequencies to remain to the extent indicated by the hatched region 148. The amplitude limiter 185 is adapted to cancel out these remaining flicker components when a DC-like signal is detected.

The output $V_{HL}$ of the horizontal low-pass filter 184 has the same value as $V_{HL}$ in the fifth embodiment. A subtractor 186 subtracts $V_{HL}$ from $V_H$, with a one-pixel delay of $V_H$ in register 124 to synchronize the two signals. The resulting difference $Y_{HH}$ has the same value as $Y_{HH}$ in the fifth embodiment.

Figure 23:
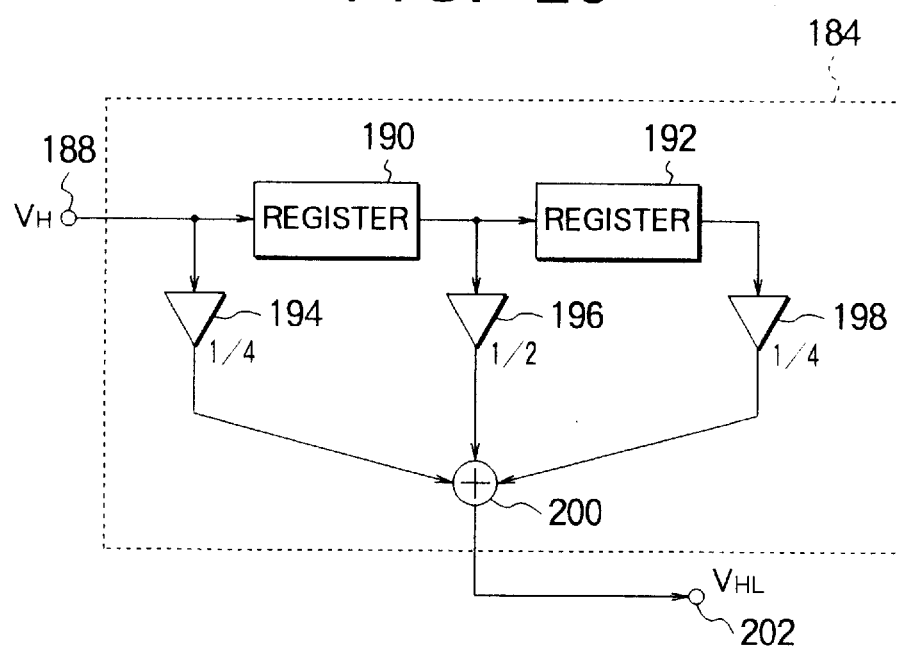
FIG. 23 is a block diagram of the horizontal low-pass filter in FIG. 22.

FIG. 23 shows the structure of the horizontal low-pass filter 184. The signal $V_H$ is received at an input terminal 188, stored in a first register 190, then passed to a second register 192. The input to the first register 190, the output from the first register 190, and the output from the second register 192 are furnished to respective multipliers 194, 196, and 198, and multiplied by respective weighting coefficients of ¼, ½, and ¼. The outputs of the multipliers 194, 196, and 198 are added by an adder 200 and provided to an output terminal 202. The signal output at terminal 202 is $V_{HL}$.

The direct-current detector 183 operates in the sixth embodiment as in the fifth embodiment, by comparing $Y_{HH}$ with a threshold $\alpha$, and detecting a DC-like signal and activating the control signal S when $-\alpha \leq Y_{HH} \leq \alpha$. Computer simulation indicates that if $Y_{HH}$ varies between minus one hundred twenty-seven and plus one hundred twenty-eight, best results are obtained when the value of $\alpha$ is about three.

As in the fifth embodiment, the amplitude limiter 185 receives $V_{HL}$ and operates with two limiting characteristics which are selected by the control signal S. These limiting characteristics differ from the limiting characteristics of the amplitude limiter 171 in the fifth embodiment.

Figure 24:
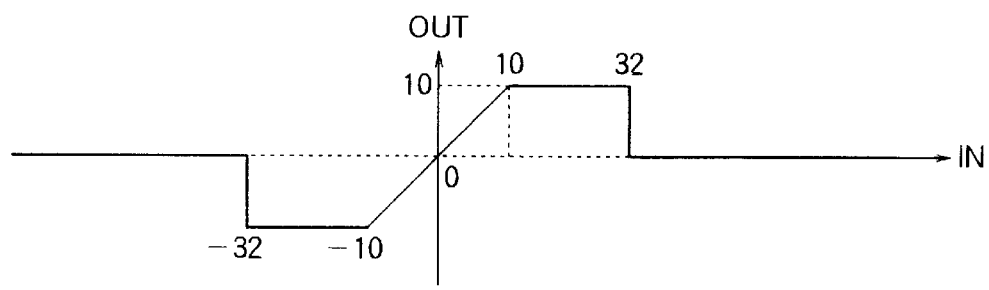
FIG. 24 illustrates a first limiting characteristic of the amplitude limiter in FIG. 22.

FIG. 24 shows the characteristic selected when the control signal S is inactive. Input values are indicated on the horizontal axis, and output values on the vertical axis. Input values with absolute values of ten or less are output without alteration. Input values with absolute values from ten to thirty-two are limited to an output value of ten. Input values with absolute values higher than thirty-two are limited to zero.

Figure 25:
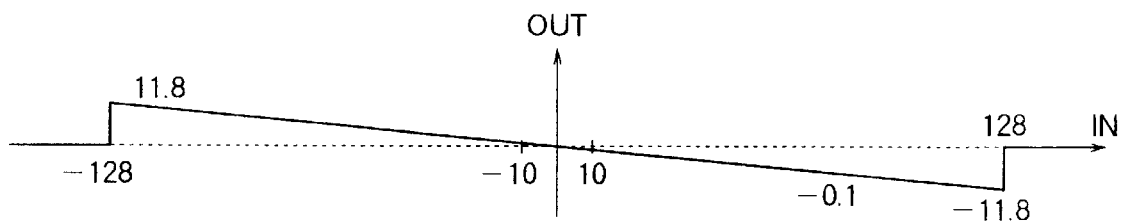
FIG. 25 illustrates a second limiting characteristic of the amplitude limiter in FIG. 22.

FIG. 25 shows the characteristic selected when the control signal S is active, again with input on the horizontal axis and output on the vertical axis. Input values with absolute values of ten or less are limited to zero. Input values from minus one-hundred twenty-eight to minus ten are output as values from 11.8 to zero, according to the following formula, thereby reversing the sign of the $V_{HL}$ signal.

$$Output = -0.1 - (input + 10)$$

Input values from ten to one-hundred twenty-eight are output as values from zero to -11.8 according to the following formula, again reversing the sign of the $V_{HL}$ signal.

$$Output = -0.1 - (input + 10)$$

Adders 130 and 78 add the output of the amplitude limiter 185 to the signals $V_L$ and $Y_{HH}$ output from register 76 and subtractor 186 to create the filtered luminance signal Yout.

The operation of the sixth embodiment will next be described for two cases.

Figure 26:
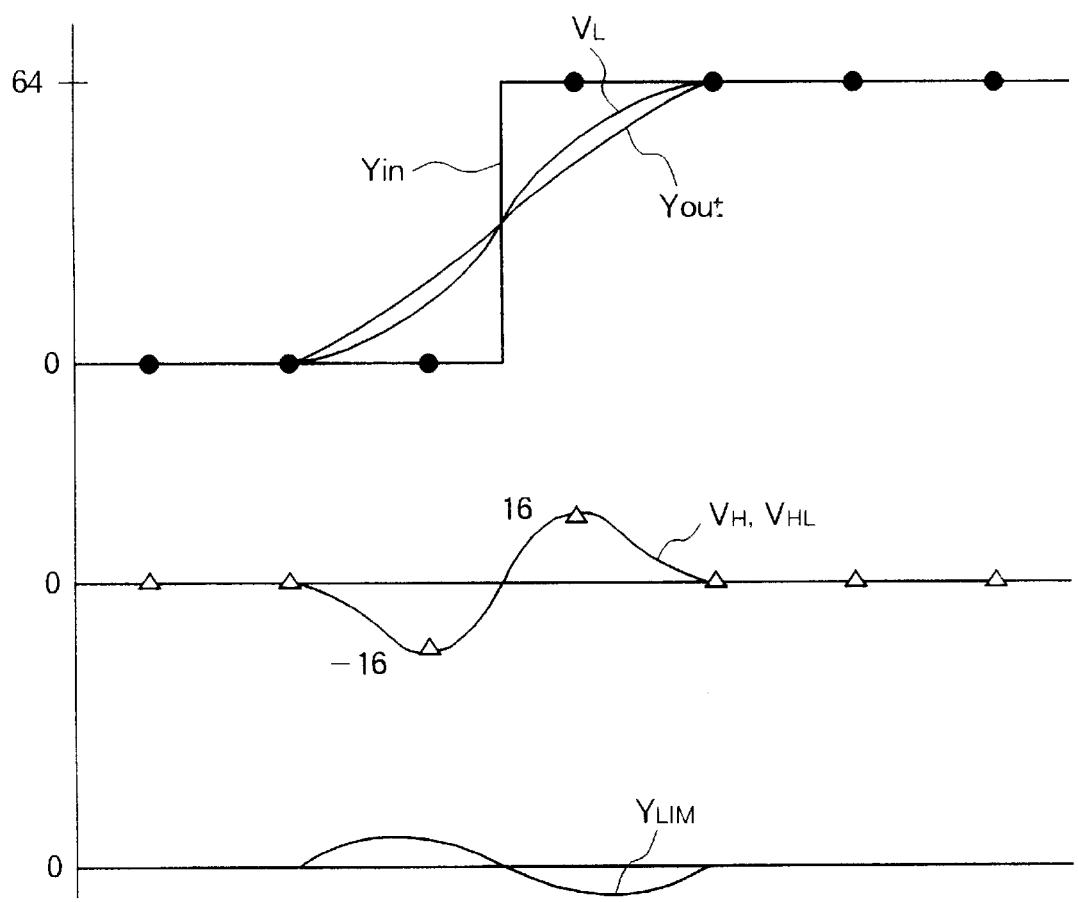
FIG. 26 illustrates the operation of the sixth embodiment in an image that is substantially constant in the horizontal direction but has a step transition in the vertical direction.

Referring to FIG. 26, the first case is that of a signal which is DC-like in the horizontal direction but has a luminance step transition in the vertical direction. The black dots at the top of FIG. 26 represent seven vertically adjacent pixels, the first three having a luminance value of zero and the second four having a luminance value of sixty-four. The first vertical low-pass filter 68 converts this step-like vertical Yin waveform to the smoother $V_L$ waveform. Subtractor 72 obtains the $V_H$ waveform shown below. The signal is by assumption DC-like in the horizontal direction, so $V_{HL}$ is identical to $V_H$ and $Y_{HH}$ (not shown) is zero. The direct-current detector 183 compares $Y_{HH}$ with $\alpha$ and activates control signal S. Operating with the characteristic shown in FIG. 25, the amplitude limiter 171 reduces $V_{HL}$ to the $Y_{LIM}$ waveform shown at the bottom of FIG. 26.

The output waveform Yout is the sum of $V_L$, $Y_{LIM}$, and $Y_{HH}$ (which is zero). Due to the reversal of the sign of $Y_{LIM}$, Yout rises from a luminance level of zero to a luminance level of sixty-four even more gradually than does $V_L$. Flicker is removed substantially completely. Referring again to FIG. 14, which shows the spatial frequency characteristic of the first vertical low-pass filter 68 that produces $V_L$, the reversal of the sign of $V_{HL}$ has removed the residual flicker in region 148.

Figure 27:
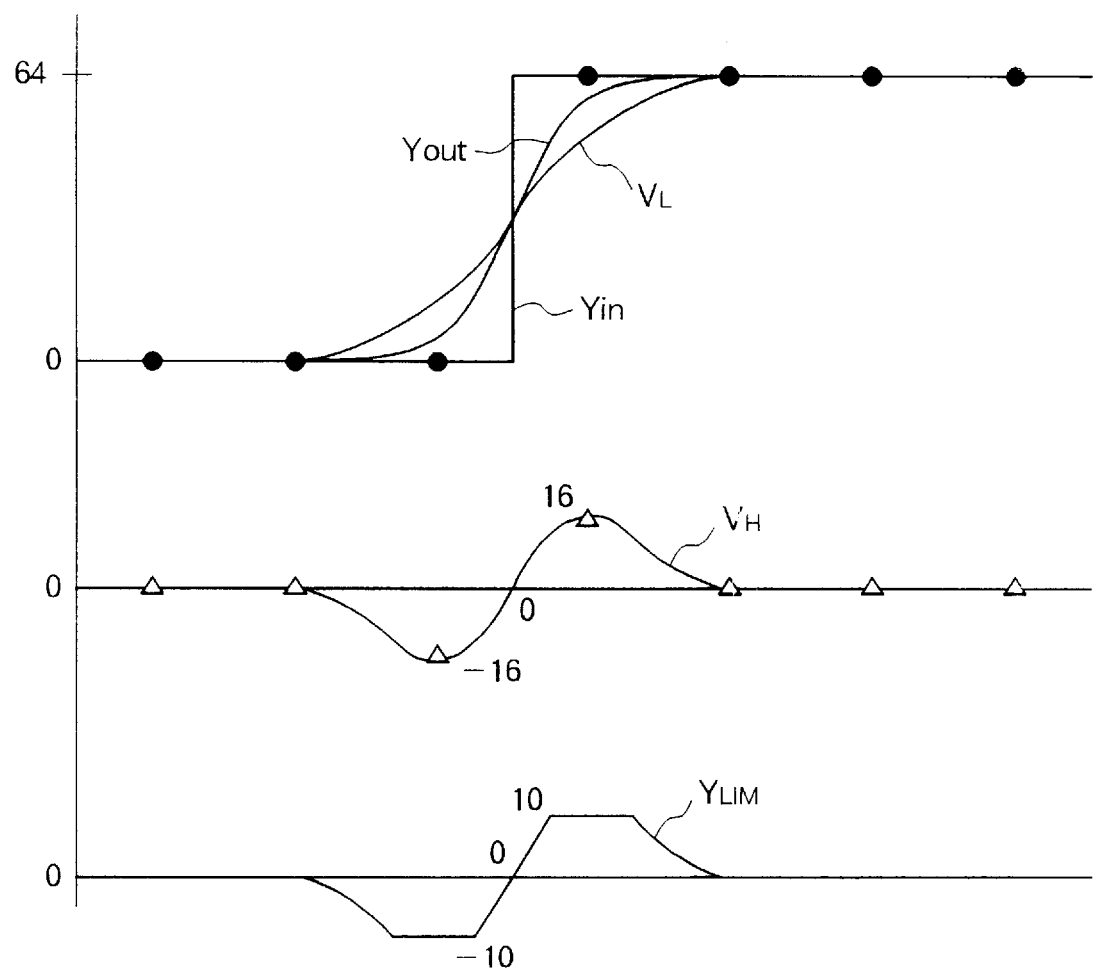
FIG. 27 illustrates the operation of the sixth embodiment in an image that is not substantially constant in the horizontal direction, and has a step transition in the vertical direction.

Referring to FIG. 27, the second case is that of a signal which has the same vertical luminance step transition, but is not DC-like in the horizontal direction. Yin, $V_L$, and $V_H$ are the same as in FIG. 26, but the amplitude limiter 171 now operates with the characteristic shown in FIG. 24, so $Y_{LIM}$ resembles a truncated version of $V_H$. The exact shape of the $Y_{LIM}$ waveform depends on the $V_{HL}$ waveform (not shown), which is no longer identical to $V_H$ because $Y_{HH}$ (also not shown) is no longer zero, but in any case, the sum of $V_L$, $Y_{LIM}$, and $Y_{HH}$ differs from the input waveform Yin only to the extent that $Y_{LIM}$ differs from $V_{HL}$, so a Yout waveform like the one shown is obtained. The transition from zero to sixty-four in this Yout waveform takes place with nearly the same abruptness as the transition in the input waveform Yin. There is accordingly substantially no loss of vertical resolution.

Computer simulation shows that in scan conversion of computer-generated tables and chart, the sixth embodiment can almost completely remove the residual flicker associated with horizontal lines, while maintaining excellent legibility of small text.

Seventh Embodiment

The seventh embodiment also differs from the first embodiment only in the internal structure and operation of the deflickering circuit 30.

Figure 28:
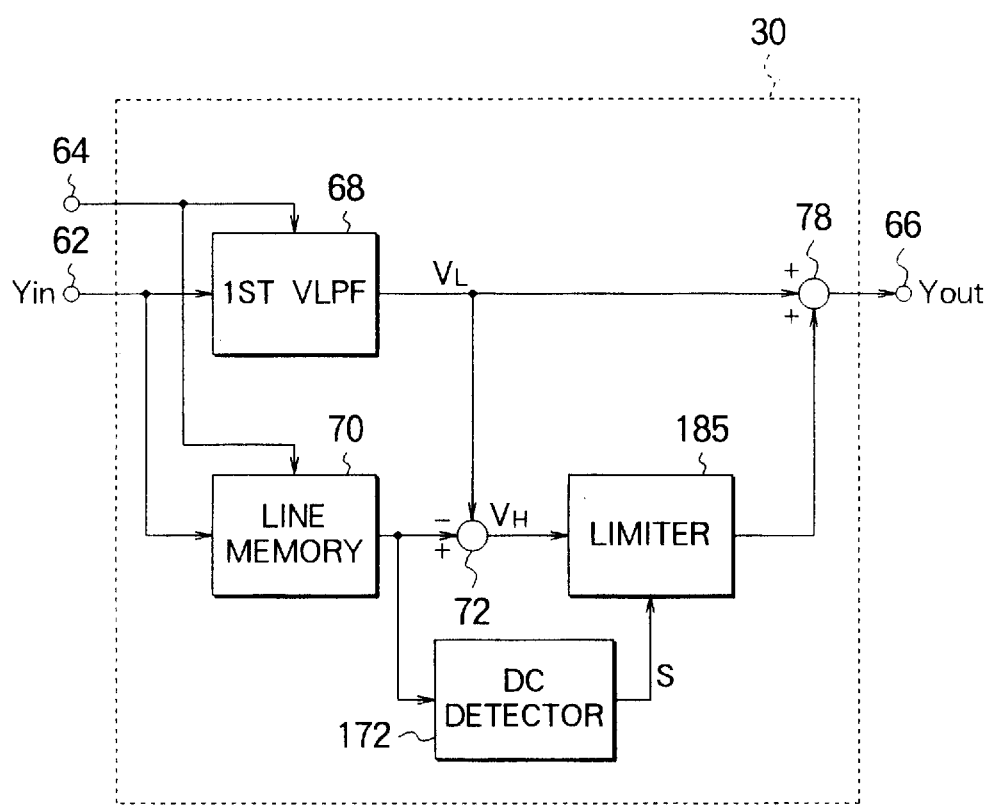
FIG. 28 is a block diagram of the deflickering circuit in the seventh embodiment.

FIG. 28 shows the deflickering circuit 30 in the seventh embodiment. The first vertical low-pass filter 68, line memory 70, subtractor 72, adder 78, and amplitude limiter 185 are the same as in the sixth embodiment, except that the amplitude limiter 185 operates directly on the vertical high-frequency signal $V_H$ output by the subtractor 72. The limiting characteristics of the amplitude limiter 185 are the characteristics shown in FIGS. 24 and 25. The control signal S that selects these characteristics is generated by the direct-current detector 172 employed in the fourth embodiment, which receives the delayed luminance signal Yin output from line memory 70.

A detailed description of the seventh embodiment will be omitted, as all elements of the seventh embodiment have been described in preceding embodiments.

The operation of the seventh embodiment is generally similar to the operation of the sixth embodiment, except that the amplitude limiter 185 operates on the entire vertical high-frequency component $V_H$, instead of just the horizontal low-frequency part. Flicker is therefore removed more completely than in the sixth embodiment. When the direct-current detector 172 detects a horizontally DC-like input signal Yin, the limiting characteristic in FIG. 25 is selected, and residual flicker is canceled out by a reversal of the sign of $V_H$, as in the sixth embodiment. When the input signal Yin is not horizontally DC-like, the characteristic in FIG. 24 is selected, limiting the amplitude of the vertical high-frequency flicker.

Eighth Embodiment

The eighth embodiment differs from the preceding embodiments in having a selectable enlargement mode.

Figure 29:
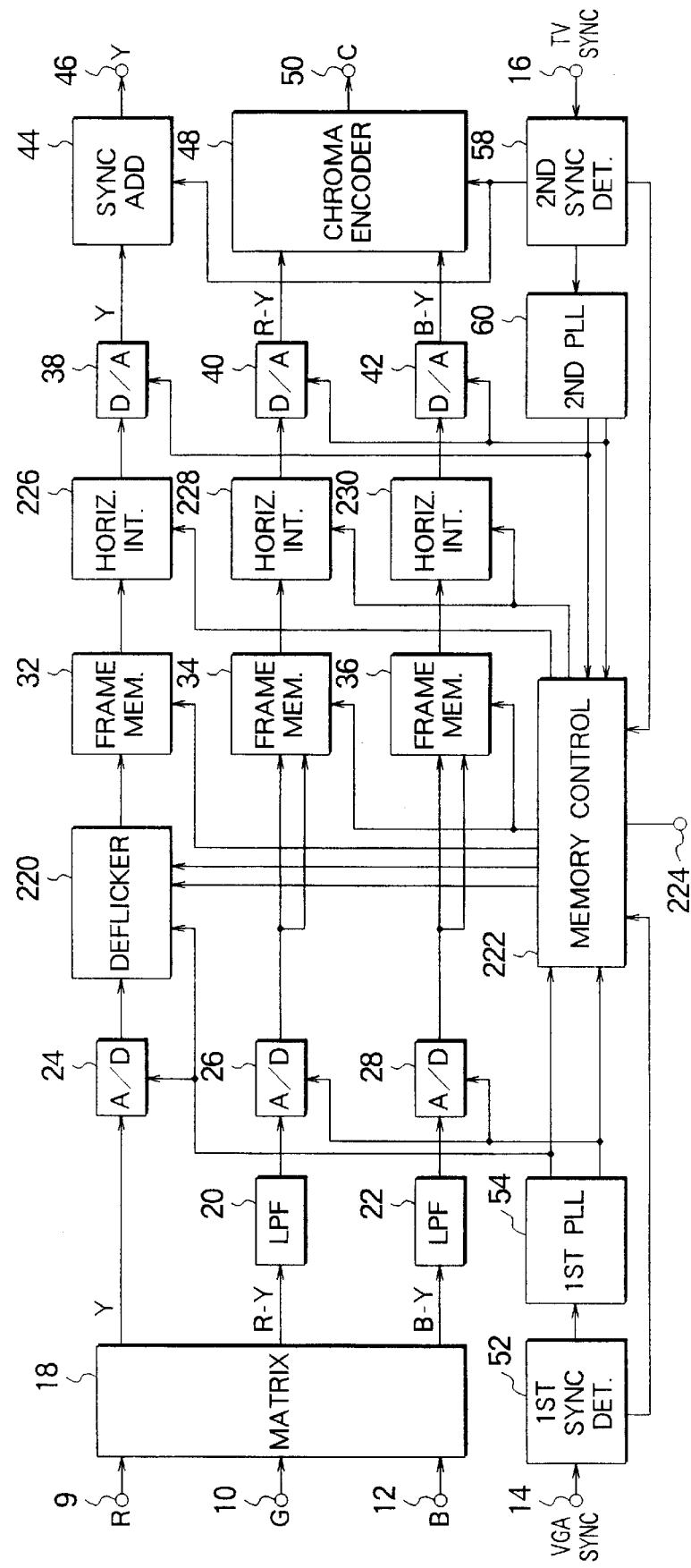
FIG. 29 is a block diagram of the eighth embodiment.

FIG. 29 shows the structure of the eighth embodiment, using the same reference numerals as in FIG. 4 for identical elements. Descriptions of these elements will be omitted. Like the preceding embodiments, the eighth embodiment converts a progressively scanned VGA signal to an interlaced NTSC signal. The differences between the eighth embodiment and the preceding embodiments concern the internal structure of the deflickering circuit 220 and memory control circuit 222, an input terminal 224 at which the memory control circuit 222 receives expansion information, and three horizontal interpolating circuits 226, 228, and 230 inserted between the frame memories 32, 34, and 36 and D/A converters 38, 40, and 42.

Figure 30:
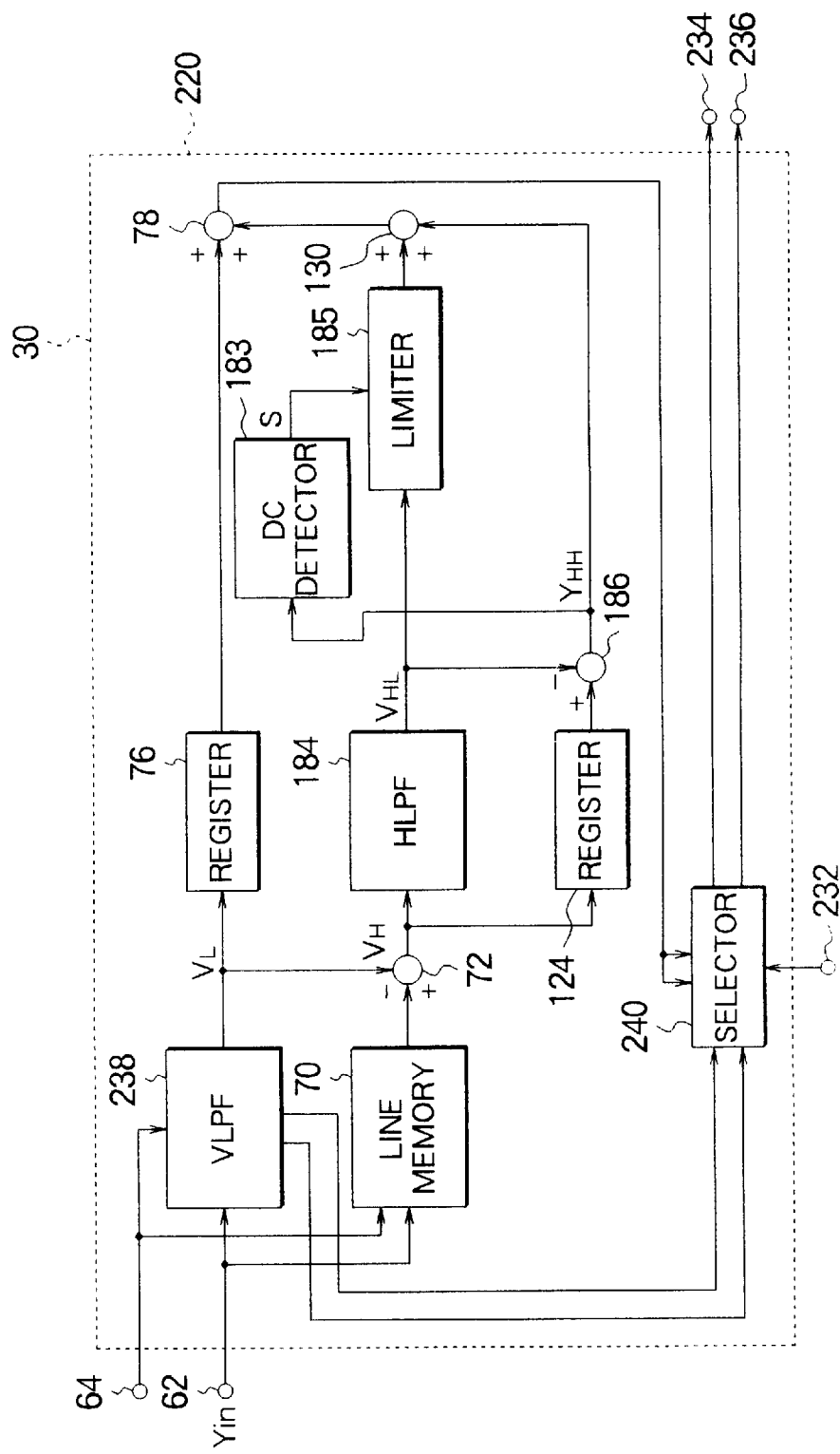
FIG. 30 is a block diagram of the deflickering circuit in the eighth embodiment.

FIG. 30 shows the structure of the deflickering circuit 220 in the eighth embodiment, using the same reference numerals as in FIG. 21 for elements that are identical to elements in the sixth embodiment. In addition to input terminals 62 and 64, the deflickering circuit 220 has a third input terminal 232 for receiving a mode control signal from the memory control circuit 222 in FIG. 29, and two output terminals 234 and 236. The vertical low-pass filter 238 differs in internal structure from the first vertical low-pass filter 68 in the sixth embodiment, and provides outputs to a selector 240 as well as providing the vertical low-frequency signal $V_L$. The selector 240 also receives the sum output by adder 78, and provides output signals to the output terminals 234 and 236. Both output terminals 234 and 236 are coupled to frame memory 32. The other elements in FIG. 30 are identical to the corresponding elements in FIG. 22.

Figure 31:
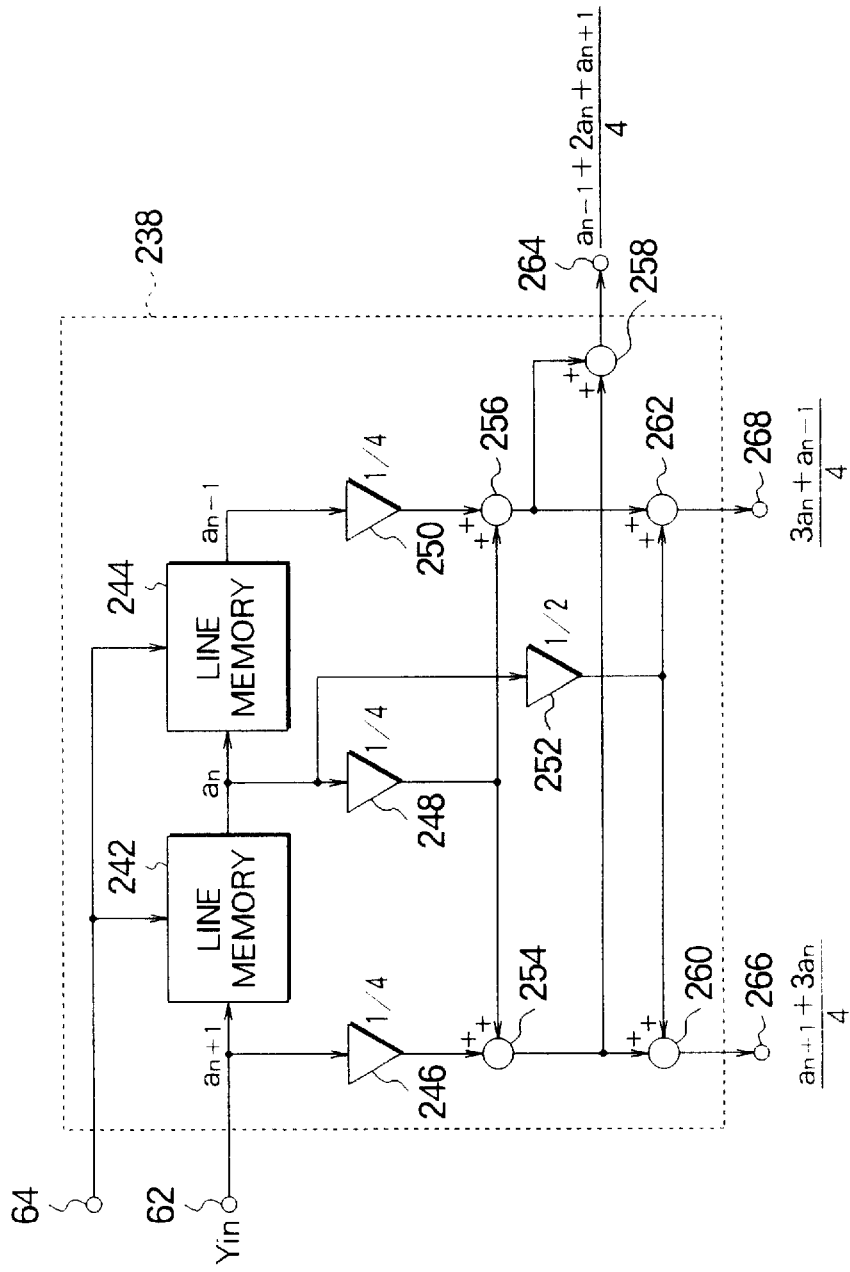
FIG. 31 is a block diagram of the vertical low-pass filter in FIG. 30.

FIG. 31 shows the internal structure of the vertical low-pass filter 238. The luminance signal Yin received at input terminal 62 is supplied to a cascaded pair of line memories 242 and 244. The input to line memory 242, the output from line memory 242, and the output from line memory 244 are supplied, respectively, to three multipliers 246, 248, and 250 and multiplied by ¼. The output of line memory 242 is also supplied to a fourth multiplier 252 and multiplied by ½. A first adder 254 adds the outputs of multipliers 246 and 248. A second adder 256 adds the outputs of multipliers 248 and 250. A third adder 258 adds the outputs of adders 254 and 256. A fourth adder 260 adds the output of multiplier 252 to the output of the first adder 254. A fifth adder 262 adds the output of multiplier 252 to the output of the second adder 256. The sum obtained by adder 260 is provided to a first output terminal 266. The sum obtained by adder 262 is provided to a second output terminal 268.

Figure 32:
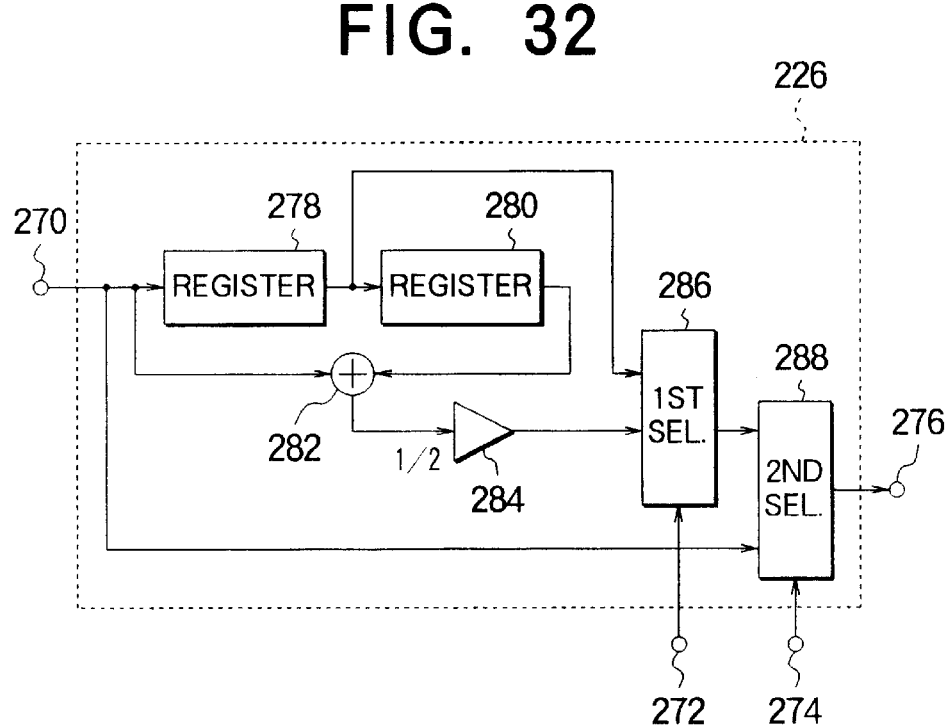
FIG. 32 is a block diagram of the horizontal interpolating circuits in the eighth embodiment.

FIG. 32 shows the structure of the first horizontal interpolating circuit 226. The luminance signal read from the first frame memory 32 in FIG. 29 is received at an input terminal 270, while control signals from the memory control circuit 222 are received at input terminals 272 and 274. The signal received at input terminal 272 alternately selects the input luminance signal and an interpolated signal, as described below. The signal received at input terminal 274 selects a normal mode or an expanded mode. The output terminal 276 of the first horizontal interpolating circuit 226 is coupled to the first D/A converter 38 in FIG. 29.

Input terminal 270 feeds the luminance signal into a cascaded pair of registers 278 and 280, each of which provides a one-pixel delay. An adder 282 adds the input of register 278 and the output of register 280, and a multiplier 284 multiplies the resulting sum by ½. A first selector 286 selects either the output of register 278 or the output of multiplier 284, responsive to the signal received at input terminal 272. A second selector 288 selects either the output of the first selector 286 or the signal input at terminal 270, responsive to the mode signal received at input terminal 274, and provides the selected signal to the output terminal 276.

The other horizontal interpolating circuits 228 and 230 are identical in structure to the first horizontal interpolating circuit 226, although they operate on the color difference signals read from the second and third frame memories 34 and 36, and provide output to the second and third D/A converters 40 and 42.

Next the concept behind the eighth embodiment will be briefly explained.

The preceding embodiments reduced flicker with comparatively little loss of vertical resolution, but some loss of vertical resolution inevitably occurs, so those embodiments are unable to preserve the legibility of the smallest sizes of computer-generated text. If such text is to be read after scan conversion, it must be expanded during the scan conversion process. The eighth embodiment expands an arbitrary rectangular area having half the width and half the height of the screen, so that this area fills the screen.

Figure 33:
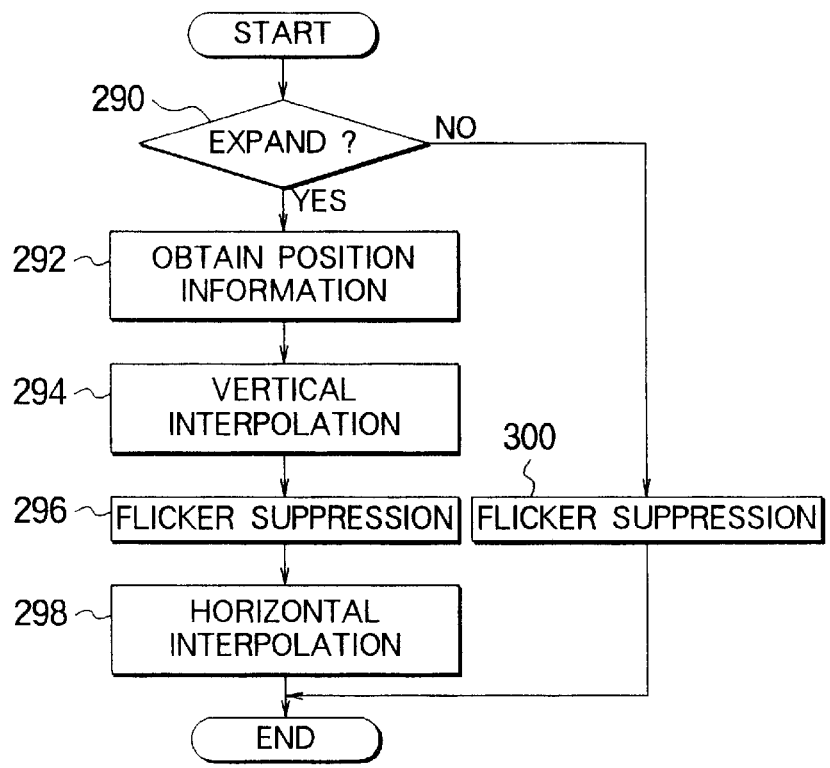
FIG. 33 is a flowchart illustrating the expansion and flicker-suppression operation of the eighth embodiment.

For reasons described earlier, expansion by direct interpolation from one field into another leads to flicker problems. The eighth embodiment accordingly operates as shown in FIG. 33. In step 290, the memory control circuit 222 determines, from the received expansion information, whether expansion is required in the current frame. If expansion is required, in step 292 the memory control circuit 222 determines, from the expansion information, the location of the part of the original image that is to be expanded.

The actual expansion process is carried out in steps 294, 296, and 298. In step 294 vertical interpolation is performed to expand the height of the image, by using the same pixel data for both even and odd fields. Next flicker is suppressed in step 296 by means of a vertical low-pass filter with three taps. In step 298, horizontal interpolation is performed to expand the width of the image, by interpolating average values.

Where expansion is not carried out, the interpolation processes are bypassed and only a flicker-suppression step 300 is carried out.

Figure 34:
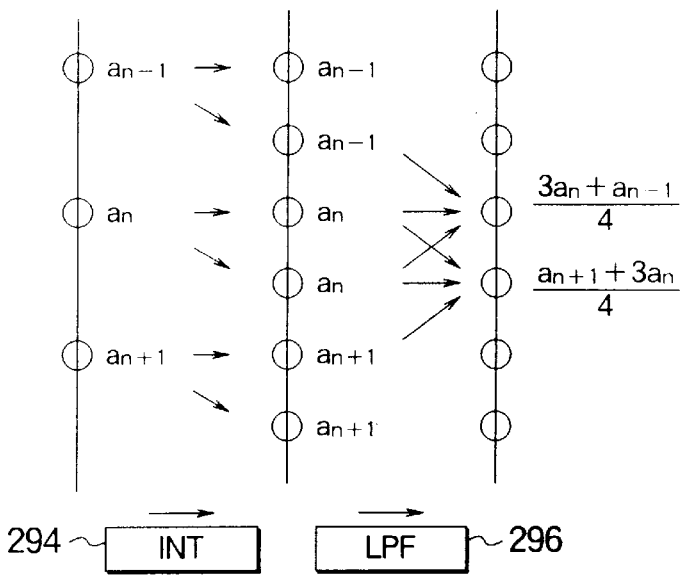
FIG. 34 is a diagram further illustrating the expansion and flicker-suppression operation of the eighth embodiment.

Steps 294 and 296 are further illustrated in FIG. 34. The symbols $a_{n-1}$, $a_n$, and $a_{n+1}$ represent three vertically adjacent input pixels in the same frame. In the vertical interpolation step 294, each input pixel value is copied to two pixel positions, one in an odd scanning line, and the other in the even scanning line just below. Input pixels $a_{n-1}$, $a_n$, and $a_{n+1}$ thereby produce six vertically adjacent pixels. This step doubles the height of the expanded part of the image by doubling the number of scanning lines in that part.

In the flicker suppression step 296, the vertically expanded image is filtered by a vertical low-pass filter with tap values of ¼, ½, and ¼. The value of the pixel in the n-th scanning line of the odd field then becomes $(3a_n+a_{n-})/4$, while the value of the pixel in the n-th scanning line of the even field becomes $(a_{n+1}+3a_n)/4$. This filtering reduces flicker.

In the horizontal interpolation step 298 in FIG. 33, the image resulting from the flicker suppression step 296 is expanded horizontally by introducing a new pixel between each pair of horizontally adjacent pixels, the value of the new pixel being the average of the two horizontally adjacent pixels.

The operation of the eighth embodiment will next be described with reference to FIGS. 29 to 32, omitting descriptions of operations that are the same as in the first embodiment.

From the VGA horizontal synchronizing signal received from the first synchronization detector 52 and the expansion information received from input terminal 224, the memory control circuit 222 generates read and write control signals for line memories 70, 242, and 244 in the deflickering circuit 220 and its vertical low-pass filter 238, and generates signals that control selector 240 in the deflickering circuit 220 and the second selectors 288 in the horizontal interpolating circuits 226, 228, and 230. The line memories 70, 242, and 244 are FIFO memories. The read and write control signals include line address reset signals, read and write enable signals, and read and write clock signals as in the first embodiment. From the VGA horizontal and vertical synchronizing signals received from the first synchronization detector 52 and the expansion information received from input terminal 224, the memory control circuit 222 also generates write control signals for the frame memories 32, 34, and 36.

The digital luminance signal Yin received from A/D converter 24 at input terminal 62 in FIG. 30 is supplied to the vertical low-pass filter 238 and line memory 70. Referring to FIG. 31, in the vertical low-pass filter 238, this signal Yin is received by line memory 242 and multiplier 246. After a one-line delay in line memory 242, the signal is passed to line memory 244 and multipliers 248 and 252. After a further one-line delay in line memory 244, the signal is passed to multiplier 250. Line memories 242 and 244 are controlled by read and write control signals received from the memory control circuit 222 at input terminal 64.

The symbols $a_{n+1}$, $a_n$, and $a_{n-}$ in FIG. 31 have the same meaning as in FIG. 34, representing three vertically adjacent pixels. From the multiplier coefficients and the interconnections of the multipliers and adders it can readily be seen that the vertical low-pass filter 238 produces the value $(a_{n-1}+2a_n+a_{n+1})/4$ at output terminal 264, the value $(a_{n+1}+3a_n)/4$ at output terminal 266, and the value $(3a_n+a_{n-1})/4$ at output terminal 268. The latter two values are provided from output terminals 266 and 268 directly to the selector 240 in FIG. 30.

The value $(a_{n-1}+2a_n+a_{n+1})/4$ obtained at output terminal 264 is the same as the value output by the first vertical low-pass filter 68 (FIG. 6) in the sixth embodiment, denoted $V_L$. The line memory 70, subtractors 72 and 186, registers 76 and 124, adders 78 and 130, direct-current detector 183, horizontal low-pass filter 184, and amplitude limiter 185 are the same as in the sixth embodiment, so the output of adder 78 is the same as the filtered luminance signal Yout in the sixth embodiment. The output of adder 78 is supplied to selector 240.

Further processing differs depending on whether expansion is or is not performed, so the two cases will be described separately.

When scan conversion is performed without expansion, the memory control circuit 222 sends selector 240 in FIG. 30 a normal mode signal causing selector 240 to select the output of adder 78. As in the preceding embodiments, each frame memory 32, 34, and 36 stores two fields of data separately, an odd field and an even field, and the memory control circuit 222 generates a control signal selecting either the odd field or the even field. When the odd field is selected, this control signal causes selector 240 to route odd scanning lines of data output by adder 78 to output terminal 234 in FIG. 30, and these scanning lines are written in the odd field in frame memory 32. When the even field is selected, this control signal causes selector 240 to route even scanning lines of data output by adder 78 to output terminal 236, and these scanning lines are written in the even field in frame memory 32.

Color difference signal data are written in field memories 34 and 36 as in the preceding embodiments. Data are also read from field memories 32, 34, and 36 as in the preceding embodiments. Referring to FIG. 32, the memory control circuit 222 sends selector 288 in the three horizontal interpolating circuits 226, 228, and 230 a normal-mode control signal causing selector 288 to select the data received at input terminal 270, so that these data pass through unaltered from input terminal 270 to output terminal 276, as if the horizontal interpolating circuits 226, 228, and 230 were not present.

From the above description it can be seen that when expansion is not performed, the eighth embodiment operates like the sixth embodiment. The data written in the frame memories 32, 34, and 36 in this case will be referred to as normal image data.

When expansion is performed, the memory control circuit 222 determines, from the expansion information received at input terminal 224, which part of the input image is to be expanded, and sends an expansion-mode signal to the deflickering circuit 220. Referring to FIGS. 30 and 31, this signal causes selector 240 to select the signals at output terminals 266 and 268 of the vertical low-pass filter 238 and route these signals to output terminals 236 and 234, respectively. Each horizontal scanning line input to the vertical low-pass filter 238 thereby generates two output scanning lines: an odd scanning line at output terminal 234 and an even scanning line at output terminal 236.

Within the area to be expanded, for the luminance signal, the memory control circuit 222 supplies write control signals and address signals that cause the data generated at output terminal 234 to be written in the odd field of frame memory 32, and the data generated at output terminal 236 to be written simultaneously in the even field of frame memory 32. For the color difference signals, the memory control circuit 222 supplies write control signals that cause each horizontal scanning line to be written simultaneously into both the even and odd fields of frame memories 34 and 36. That is, the color difference signals are interpolated by controlling the frame memories 34 and 36 so that the same horizontal scanning line data are written in both the even and odd fields. Data for pixels not appearing in the area being expanded are not written in the field memories 32, 34, and 36. The memory control circuit 222 can generate the necessary write addresses by a counting process referenced to, for example, the top left corner of the expanded area.

Within the expanded area, the luminance data are both expanded and filtered to reduce flicker. The color difference data are expanded but not filtered. As in the preceding embodiments, not filtering the color difference data reduces the hardware requirements of the scan conversion circuit, and chrominance flicker is not readily perceived by the human eye.

The reading of expanded image data from the frame memories 32, 34, and 36 also differs from the reading of normal image data. Pixel data not located in the area to be expanded are not read. In the expanded area, the read control signals generated by the memory control circuit 222 for the frame memories 32, 34, and 36 have half the frequency of the normal read signals. Referring to FIG. 32, when a luminance pixel is read from frame memory 32 into the horizontal interpolating circuit 226, it is simultaneously stored in register 278 and sent to adder 282. The previous pixel (horizontally adjacent to the left) is simultaneously moved from register 278 to register 280. Adder 282 and multiplier 284 obtain the average of the pixel value input to register 278 and the pixel value held in register 280.

After the pixel has been read into register 278, the memory control circuit 222 first sends selectors 272 and 274 control signals causing the output of multiplier 284 to be selected. The average value of two adjacent pixels is thus sent from output terminal 276 to D/A converter 38.

Next, while registers 278 and 280 continue to hold the same pixel values, the memory control circuit 222 alters the control signal at input terminal 272 so that selector 286 selects the output of register 278, and the pixel value held in register 278 is sent to output terminal 276 and D/A converter 38. Each pixel input to the horizontal interpolating circuit 226 thus generates two output pixels. The above process is repeated for each pixel in the area that is being expanded, selector 286 selecting the outputs of multiplier 284 and register 278 alternately. In this way the image is expanded by a factor of two horizontally, by horizontal average-value interpolation between each pair of pixels in the original image. This does not produce flicker because the interpolated pixels are disposed in the same field as the original pixels.

The color-difference signals are processed in the same way by horizontal interpolating circuits 228 and 230, so that the chrominance signal is also expanded horizontally by interpolation of average values.

In expansion mode, the frame memories 32, 34, and 36 need store only half of the pixel data for each horizontal scanning line. Performing horizontal interpolation after scan conversion thus has the effect of reducing the power consumption of the scan conversion circuitry, by reducing the number of read and write accesses to the frame memories 32, 34, and 36.

The expansion information received at input terminal 224 can be generated by the computer in response to user commands. A typical use of the expansion function is to let the user zoom in on a desired part of a display. An expanded view of the entire display can be obtained by vertical and horizontal scrolling. By expanding the display, the eighth embodiment can greatly enhance the readability of text, while strongly suppressing flicker.

The eighth embodiment has been described as taking an arbitrary rectangular area with half the width and half the height of the original display, and expanding this area to fill the screen. It is also possible, however, to expand a smaller portion of the original display and replace only part of the original image with the expanded image. This can be accomplished by suitable modification of the read, write, and mode control signals output by the memory control circuit 222.

The eighth embodiment is not restricted to horizontal expansion by interpolation of average values. Generally similar results can be obtained by simply repeating each pixel value to generate two horizontally adjacent pixels.

As described above, the invention improves the legibility of computer-generated text in tables, charts, menus, and the like while reducing the flicker caused by the horizontal dividing lines or boundary lines of these items, but the effect of the invention extends further. Without causing obvious flicker, the invention enhances the visibility of many types of vertical fine detail, including detail in pictorial images containing no text.

The preceding eight embodiments have received a progressively scanned video signal input a frame at a time, but the invention can be adapted to reduce flicker in other types of video signals. For example, the input signal may be an interlaced video signal that was originally progressively scanned, but has been converted from progressive to interlaced scanning without flicker reduction, then transmitted over a communication channel or stored on a recording medium. This type of interlaced video signal can be converted back to progressive scanning by a field-frame conversion circuit employing a memory device, then supplied to the deflickering circuit of one of the preceding embodiments to remove flicker.

Figure 35:
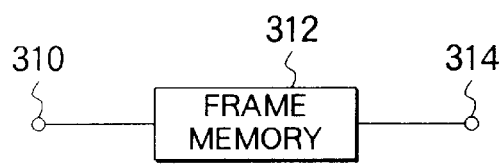
FIG. 35 is a block diagram of a field-frame conversion circuit.
Figure 36:
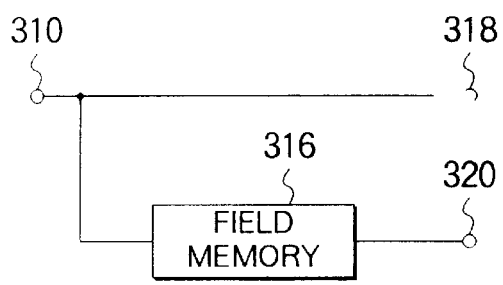
FIG. 36 is a block diagram of another field-frame conversion circuit.

FIGS. 35 and 36 show two examples of field-frame conversion circuits.

In FIG. 35, an interlaced video signal is received, a field at a time, at an input terminal 310 and stored in a frame memory 312, from which a progressively scanned video signal is output at an output terminal 314. A sync separation circuit (not visible) separates synchronizing signals from the input video signal, identifies even and odd fields, and controls the addresses at which successive scanning lines are stored in the frame memory 312 in such a way as to convert the video signal from an interlaced structure to a progressively scanned structure. The resulting progressively scanned video signal is supplied from output terminal 314 to one of the embodiments described above, for deflickering and reconversion from progressive scanning to interlaced scanning.

In FIG. 36, the interlaced video signal is received at an input terminal 310, temporarily stored in a field memory 316, supplied without delay from input terminal 310 to a first output terminal 318, and supplied with a delay of one field from field memory 316 to a second output terminal 320. The signals obtained at output terminals 318 and 320 are combined into a progressively scanned signal by, for example, a vertical low-pass filtering process that takes a weighted average of the values of a pixel in the current field and the two vertically adjacent pixels in the preceding field. The resulting progressively scanned video signal is then supplied to one of the embodiments described above, for deflickering and reconversion to interlaced scanning.

In this way the invention can be employed to reduce the flicker resulting from scan conversion, without unnecessary loss of vertical resolution, even after scan conversion has already taken place.

More generally, the invention can be used to reduce flicker present in an interlaced video signal, without unnecessary loss of vertical resolution, even if the flicker was not produced by scan conversion.

The invention is not limited to VGA-to-NTSC conversion. The invention can be used in converting any type of progressively scanned video signal to any type of interlaced video signal. Examples of other types of progressively scanned video signals include digital television broadcast signals conforming to the proposed European DVB standard, American ATV standard, or Japanese ISDB standard, as well as computer-generated video signals of types other than VGA.

The deflickering circuits described in the preceding embodiments can be used to reduce flicker in red, green, and blue component signals, or in color difference signals, if circumstances make this desirable. If flicker is removed from the color difference signals, the operating characteristics or configurations of the deflickering circuits that process the two color difference signals may differ from the operating characteristics or configuration of the deflickering circuit 30 that processes the luminance signal, or from each other.

The matrix circuit may convert the input red, green, and blue signals to a luminance signal and two color signals (e.g. Y, U, and V), instead of to luminance and color difference signals (Y, R-Y, B-Y). Modulation of the color subcarrier may be performed before the conversion from progressive to interlaced scanning. The effect of reducing flicker in the luminance signal Y remains the same.

The filters used to separate horizontal and vertical high-frequency and low-frequency components need not have the configurations shown in FIGS. 6, 7, 13, and 17. Other types of high-pass and low-pass filters can be employed, including, for example, filters with more taps, filters with different filter configurations, finite-impulse-response (FIR) filters, infinite-impulse-response (IIR) filters, and the like. The vertical high-frequency and low-frequency signals $V_H$ and $V_L$ can be separated by using a high-pass filter to extract $V_H$ and subtracting $V_H$ from the input signal Yin to obtain VL, instead of subtracting $V_L$ from Y to obtain $V_H$.

Those skilled in the art will recognize that further modifications are possible within the scope claimed below.

What is claimed is:

1. A scan conversion apparatus for converting a video input signal having progressively scanned even and odd horizontal scanning lines to a video output signal in which said even and odd horizontal scanning lines are scanned in an interlaced manner, and for reducing flicker in said video output signal, comprising:

a deflickering circuit for attenuating spatial frequency components of said video input signal that combine high vertical spatial frequency with low horizontal spatial frequency, thereby producing a filtered video signal; and scan conversion means coupled to said deflickering circuit, for converting said filtered video signal from progressive scanning to interlaced scanning.

2. The scan conversion apparatus of claim 1, wherein said deflickering circuit comprises:

a vertical filtering circuit for separating high and low vertical spatial frequency components of said video input signal, thereby producing a vertical high-frequency signal and a vertical low-frequency signal;

a horizontal filtering circuit for extracting high horizontal spatial frequency components of said vertical high-frequency signal, thereby producing a horizontal-high-frequency-vertical-high-frequency signal; and an adder for adding said horizontal-high-frequency-vertical-high-frequency signal to said vertical low-frequency signal to produce said filtered video signal.

3. The scan conversion apparatus of claim 2, wherein said deflickering circuit also comprises:

an amplitude converting circuit coupled between said horizontal filtering circuit and said adder, for modifying said horizontal-high-frequency-vertical-high-frequency signal in amplitude before input to said adder.

4. The scan conversion apparatus of claim 1, wherein said deflickering circuit separates said video input signal into a first component simultaneously having both high vertical spatial frequency and low horizontal spatial frequency, and a second component not simultaneously having both the high vertical spatial frequency and the low horizontal spatial frequency, and comprises:

an amplitude limiter for limiting said first component in amplitude to produce a limited first component; and an adder for adding said limited first component to said second component to produce said filtered video signal.

5. The scan conversion apparatus of claim 4, wherein said amplitude limiter operates with different limiting characteristics responsive to a control signal, further comprising:

a direct-current detector for generating said control signal by detecting direct-current-like portions of said video input signal.

6. The scan conversion apparatus of claim 5, wherein:

when said direct-current detector detects a direct-current-like portion of said input video signal, said amplitude limiter reduces said first component in amplitude and reverses said first component in sign; and when said direct-current detector does not detect a direct-current-like portion of said input video signal, said amplitude limiter limits said first component to a certain maximum amplitude.

7. The scan conversion apparatus of claim 5, wherein said deflickering circuit separates high vertical spatial frequency components of said video input signal from low vertical spatial frequency components of said video input signal, and said direct-current detector generates said control signal by detecting direct-current-like portions of said high vertical spatial frequency components.

8. The scan conversion apparatus of claim 5, wherein said deflickering circuit extracts, as part of said second component, a signal having high horizontal spatial frequency, said direct-current detector compares said signal having high horizontal spatial frequency with a threshold value, and said direct-current detector detects a direct-current-like portion when said signal having high horizontal spatial frequency has an absolute value less than said threshold value.

9. A scan conversion apparatus for converting a video input signal having progressively scanned even and odd horizontal scanning lines and made up of red, green, and blue component signals to a video output signal in which said even and odd horizontal scanning lines are scanned in an interlaced manner, and for reducing flicker in said video output signal, comprising:

a matrix circuit for converting said red, green, and blue component signals into a luminance signal and two chrominance signals;

a deflickering circuit coupled to said matrix circuit, for attenuating spatial frequency components of said luminance signal that combine high vertical spatial frequency with low horizontal spatial frequency, thereby producing a filtered luminance signal;

first scan conversion means coupled to said deflickering circuit, for converting said filtered luminance signal from progressive scanning to interlaced scanning; and a pair of second scan conversion means coupled to said matrix circuit, for converting said chrominance signals from progressive scanning to interlaced scanning.

10. The scan conversion apparatus of claim 9, further comprising a pair of low-pass filters coupled between said matrix circuit and said second scan conversion means, for limiting said chrominance signals in bandwidth, wherein:

said first scan conversion means receives said filtered luminance signal at a first rate; and said second scan conversion means receive said chrominance signals at a second rate equal to at most one-half of said first rate.

11. A scan conversion apparatus for converting a video input signal having progressively scanned even and odd horizontal scanning lines to a video output signal in which said even and odd horizontal scanning lines are scanned in an interlaced manner, and for reducing flicker in said video output signal, comprising:

a horizontal filtering circuit for separating high and low horizontal spatial frequency components of said video input signal, thereby producing a horizontal high-frequency signal and a horizontal low-frequency signal;

a first vertical filtering circuit for attenuating high vertical spatial frequencies in said horizontal low-frequency signal by a first amount;

a second vertical filtering circuit for attenuating high vertical spatial frequencies in said horizontal high-frequency signal by a second amount less than said first amount;

an adder for adding respective outputs of said first vertical filtering circuit and said second vertical filtering circuit to produce said filtered video signal; and a scan conversion means coupled to said adder, for converting said filtered video signal from progressive scanning to interlaced scanning.

12. A scan conversion apparatus for converting a video input signal having progressively scanned even and odd horizontal scanning lines to a video output signal in which said even and odd horizontal scanning lines are scanned in an interlaced manner, and for reducing flicker in said video output signal, comprising:

a vertical filtering circuit for separating high and low vertical spatial frequency components of said video input signal, thereby producing a vertical high-frequency signal and a vertical low-frequency signal;

an amplitude limiter coupled to said vertical filtering circuit, for limiting said vertical high-frequency signal in amplitude to produce a limited vertical high-frequency signal, said amplitude limiter operating with different limiting characteristics responsive to a control signal;

a direct-current detector coupled to said amplitude limiter, for generating said control signal by detecting direct-current-like portions of said video input signal;

an adder for adding said limited vertical high-frequency signal to said vertical low-frequency signal to produce said filtered video signal; and scan conversion means coupled to said adder, for converting said filtered video signal from progressive scanning to interlaced scanning.

13. The scan conversion apparatus of claim 12, wherein:

when said direct-current detector detects a direct-current-like portion of said input video signal, said amplitude limiter reduces said vertical high-frequency signal in amplitude and reverses said vertical high-frequency in sign; and when said direct-current detector does not detect a direct-current-like portion of said input video signal, said amplitude limiter limits said vertical high-frequency signal to a certain maximum amplitude.

14. The scan conversion apparatus of claim 12, wherein said direct-current detector detects direct-current-like portions of said video input signal by detecting direct-current-like portions of said vertical high-frequency signal.

15. The scan conversion apparatus of claim 12, further comprising a horizontal filtering circuit coupled to said vertical filtering circuit, for extracting a horizontal high-frequency component of said vertical high-frequency signal, wherein:

said direct-current detector compares said horizontal high-frequency component of said vertical high-frequency signal with a threshold value, and detects a direct-current-like portion of said video input signal when said horizontal high-frequency component of said vertical high-frequency signal has an absolute value less than said threshold value.

16. A scan conversion apparatus for converting a video input signal having progressively scanned even and odd horizontal scanning lines to a video output signal in which said even and odd horizontal scanning lines are scanned in an interlaced manner, and for reducing flicker in said video output signal, comprising:

a deflickering circuit for attenuating flicker in said video input signal, thereby producing a filtered video signal;

a control circuit for receiving expansion information and causing said deflickering circuit to expand a selected part of said input video signal vertically by vertical interpolation followed by vertical low-pass filtering, responsive to said expansion information;

a horizontal interpolating circuit coupled to said control circuit for expanding said selected part horizontally by horizontal interpolation; and scan conversion means coupled to said deflickering circuit, for converting said filtered video signal from progressive scanning to interlaced scanning.

17. The scan conversion apparatus of claim 16, wherein said horizontal interpolating circuit is coupled to an output side of said scan conversion means and performs horizontal interpolation after said filtered video signal has been converted from progressive scanning to interlaced scanning.

18. The scan conversion apparatus of claim 16, wherein said input video signal is made up of a luminance signal and two chrominance signals and said deflickering circuit processes only said luminance signal, further comprising:

a pair of chrominance scan conversion means controlled by said control circuit, for converting said chrominance signals from progressive scanning to interlaced scanning, and expanding said chrominance signals vertically within said selected part of said input video signal.

19. A flicker reduction apparatus for reducing flicker in an interlaced video signal received a field at a time, comprising:

a field-frame conversion circuit for temporarily storing said interlaced video signal, converting said interlaced video signal to a progressively scanned video signal, and outputting said progressively scanned video signal a frame at a time; and a deflickering circuit coupled to said field-frame conversion circuit, for attenuating spatial frequency components of said progressively scanned video signal that combine high vertical spatial frequency with low horizontal spatial frequency.

20. A flicker reduction apparatus for reducing flicker in an interlaced video signal received a field at a time, comprising:

a field-frame conversion circuit for temporarily storing said interlaced video signal, converting said interlaced video signal to a progressively scanned video signal, and outputting said progressively scanned video signal a frame at a time;

a frequency separating circuit coupled to said field-frame conversion circuit, for separating from said progressively scanned video signal a first component signal that combine high vertical spatial frequency with low horizontal spatial frequency;

a filtering circuit coupled to said field-frame conversion circuit, for attenuating spatial frequency components of said progressively scanned video signal simultaneously having both the high vertical spatial frequency and the low horizontal spatial frequency, thereby producing a second component signal;

an amplitude limiter coupled to said frequency separating circuit, for limiting said first component signal in amplitude to produce a limited first component signal; and an adder coupled to said amplitude limiter, for adding said limited first component signal to said second component signal.

21. A flicker reduction apparatus for reducing flicker in an interlaced video signal received a field at a time, comprising:

a field-frame conversion circuit for temporarily storing said interlaced video signal, converting said interlaced video signal to a progressively scanned video signal, and outputting said progressively scanned video signal a frame at a time;

a horizontal filtering circuit coupled to said field-frame conversion circuit, for separating high and low horizontal spatial frequency components of said video input signal, thereby producing a horizontal high-frequency signal and a horizontal low-frequency signal;

a first vertical filtering circuit coupled to said horizontal filtering circuit, for attenuating high vertical spatial frequencies in said horizontal low-frequency signal by a first amount;

a second vertical filtering circuit coupled to said horizontal filtering circuit, for attenuating high vertical spatial frequencies in said horizontal high-frequency signal by a second amount less than said first amount; and an adder coupled to said second vertical filtering circuit, for adding respective outputs of said first vertical filtering circuit and said second vertical filtering circuit.

22. A flicker reduction apparatus for reducing flicker in an interlaced video signal received a field at a time, comprising:

a field-frame conversion circuit for temporarily storing said interlaced video signal, converting said interlaced video signal to a progressively scanned video signal, and outputting said progressively scanned video signal a frame at a time;

a vertical filtering circuit coupled to said field-frame conversion circuit, for separating high and low vertical spatial frequency components of said progressively scanned video signal, thereby producing a vertical high-frequency signal and a vertical low-frequency signal;

a horizontal filtering circuit coupled to said vertical filtering circuit, for separating high and low horizontal spatial frequency components of said vertical high-frequency signal, thereby producing a horizontal-high-frequency-vertical-high-frequency signal and a horizontal-low-frequency-vertical-high-frequency signal;

an amplitude converting circuit coupled to said horizontal filtering circuit, for modifying said horizontal-low-frequency-vertical-high-frequency signal in amplitude to produce a modified horizontal-low-frequency-vertical-high-frequency signal, said amplitude converting circuit operating with at least two different input-output characteristics responsive to a control signal;

a direct-current detector coupled to said amplitude converting circuit, for generating said control signal by detecting direct-current-like portions of said progressively scanned video signal; and an adder coupled to said amplitude converting circuit, for adding said vertical low-frequency signal, said horizontal-high-frequency-vertical-high-frequency signal, and said modified horizontal-low-frequency-vertical-high-frequency signal together.

23. A flicker reduction apparatus for reducing flicker in an interlaced video signal received a field at a time, comprising:

a field-frame conversion circuit for temporarily storing said interlaced video signal, converting said interlaced video signal to a progressively scanned video signal, and outputting said progressively scanned video signal a frame at a time;

a vertical filtering circuit coupled to said field-frame conversion circuit, for separating high and low vertical spatial frequency components of said progressively scanned video signal, thereby producing a vertical high-frequency signal and a vertical low-frequency signal;

a horizontal filtering circuit coupled to said vertical filtering circuit, for attenuating low horizontal spatial frequency components of said vertical high-frequency signal, thereby producing a horizontal-high-frequency-vertical-high-frequency signal;

an amplitude converting circuit coupled to said horizontal filtering circuit, for modifying said horizontal-high-frequency-vertical-high-frequency signal in amplitude to produce a modified horizontal-high-frequency-vertical-high-frequency signal; and an adder coupled to said amplitude converting circuit, for adding said modified horizontal-high-frequency-vertical-high-frequency signal to said vertical low-frequency signal.

24. A flicker reduction apparatus for reducing flicker in an interlaced video signal received a field at a time, comprising:

a field-frame conversion circuit for temporarily storing said interlaced video signal, converting said interlaced video signal to a progressively scanned video signal, and outputting said progressively scanned video signal a frame at a time;

a vertical filtering circuit coupled to said field-frame conversion circuit, for separating high and low vertical spatial frequency components of said progressively scanned video signal, thereby producing a vertical high-frequency signal and a vertical low-frequency signal;

an amplitude converting circuit coupled to said vertical filtering circuit, for modifying said vertical high-frequency signal in amplitude to produce a modified vertical high-frequency signal, said amplitude converting circuit operating with at least two different input-output characteristics responsive to a control signal;

a direct-current detector coupled to said amplitude converting circuit, for generating said control signal by detecting direct-current-like portions of said video input signal; and an adder coupled to said amplitude converting circuit, for adding said vertical low-frequency signal to said modified vertical high-frequency signal.

25. A deflickering device for removing a flicker component contained in an input video signal, comprising:

frequency separating means for removing only a vertical-high-frequency-horizontal-low-frequency components from the input video signal;

wherein the output of the frequency separating means is substracted from the input video signal to thereby remove the flicker component from the input video signal.

26. The deflickering device according to claim 25, wherein said frequency separating means comprises:

first frequency separating means for separating vertical high-frequency and vertical low-frequency components from the input video signal;

second frequency separating means for separating a horizontal high-frequency component from the vertical high-frequency component; and adding means for adding the vertical low-frequency component output from the first frequency separating means and the output of the second frequency separating means.

27. A deflickering device for removing a flicker component from an output video signal, comprising:

vertical-high-frequency-horizontal-low-frequency component separating means for separating the vertical-high frequency-horizontal-low frequency component from the input video signal;

vertical-high-frequency-horizontal-low-frequency component suppressing means for suppressing a vertical-high-frequency-horizontal-low-frequency component in the input video signal;

first amplitude limiting means for limiting the amplitude of the vertical-high-frequency-horizontal-low-frequency component output from the vertical-high-frequency-horizontal-low-frequency component separating means; and adding means for adding the output of the vertical-high-frequency-horizontal-low-frequency component suppressing means and the output of the first amplitude limiting means.

28. The deflickering device according to claim 27, wherein said first amplitude limiting means has an amplitude limit value to which the amplitude of the vertical-high-frequency-horizontal-low-frequency component output from the vertical-high-frequency-horizontal-low-frequency-component separating means is limited, the deflickering device further comprising:

direct-current component detecting means for detecting a horizontal direct-current component in the input video signal;

wherein the amplitude limit value of the first amplitude limiting means is switched according to the result of the detection of the direct-current component, output from the direct-current component detecting means.

29. The deflickering device according to claim 27, wherein said first amplitude limiting means has an amplitude limit value to which the amplitude of the vertical-high-frequency-horizontal-low-frequency component output from the vertical-high-frequency-horizontal-low-frequency component separating means is limited, the deflickering device further comprising:

vertical high-frequency component separating means for separating a vertical high-frequency component from the input video signal; and direct-current component detecting means for detecting a horizontal direct-current component in the vertical high-frequency component output from the vertical high-frequency component separating means;

wherein the amplitude limit value of the first amplitude limiting means is switched according to the result of the detection of the direct-current component output from the direct-current component detecting means.

30. The deflickering device according to claim 28 or 29, comprising:

horizontal high-frequency component separating means for separating a horizontal high-frequency component from the input video signal;

wherein the amplitude of the horizontal high-frequency component output from the horizontal high-frequency component separating means is compared with a predetermined value, and said direct-current component detecting means is controlled such that said direct-current component is detected when the absolute value of the amplitude of the horizontal high-frequency component is not larger than said predetermined value.

31. A deflickering device for removing a flicker component from an input video signal in the form of R, G and B signals, comprising:

first converting means for converting the input R, G and B signals into a luminance signal and two color difference signals; and deflickering means for removing a flicker component from the input video signal, said deflickering means including, band-limiting means for limiting the bandwidth of the two color difference signals output from the first converting means to not more than half the bandwidth of the luminance signal;

wherein control is so exercised that the color difference signals output from the band limiting means are processed by a clock frequency which is not higher than half the clock frequency of the luminance signal;

wherein when the flicker component is removed from the input video signal, at least the flicker component in the luminance signal output from said first converting means is removed.

32. A deflickering device for removing a flicker componet from and input video signal, comprising:

frequency separating means for separating horizontal low-frequency and high-frequency components from the input video signal;

first vertical filtering means for removing a flicker component from the horizontal low-frequency component output front the separating means;

second vertical filtering means for removing a flicker component from the horizontal high-frequency component output from the frequency separating means; and adding means for adding the output of the first vertical filtering means and the output of the second vertical filtering means;

wherein when the flicker component is removed from the input video signal, the degree of suppression of the vertical high-frequency component by means of said first vertical filtering means is set larger than the degree of suppression of the vertical high-frequency component by means of the second vertical filtering means.

33. A deflickering device for removing a flicker component from an input video signal, comprising:

frequency separating means for separating vertical low-frequency and high-frequency components from the input video signal;

direct-current component detecting means for detecting a horizontal low-frequency component from the input video signal;

first amplitude limiting means for limiting the amplitude of the vertical high-frequency component output from the frequency separating means; and adding means for adding the vertical low-frequency component output from the frequency separating means and the output of the first amplitude limiting means;

wherein control is so exercised that the amplitude limit value of the first amplitude limiting means is switched according to the result of the detection of the direct-current component, output from the direct-current component detecting means.

34. The deflickering device according to claim 33, wherein said direct-current component detecting means is controlled such that when the horizontal direct-current component in the input video signal is detected, the horizontal direct-current component in the vertical high-frequency component output from the frequency separating means is detected.

35. The deflickering device according to claim 33, comprising:

horizontal high-frequency component separating means for separating a horizontal high-frequency component from the input video signal;

wherein the amplitude of the horizontal high-frequency component output from the horizontal high-frequency component separating means is compared with a predetermined value, and said direct-current component detecting means is controlled such that when the absolute value of the amplitude of the horizontal high-frequency component is not more than the predetermined value, said direct-current component is detected.

36. A deflickering device for removing a flicker component from an input video signal, comprising:

frequency separating means for separating vertical high-frequency and low-frequency components from the input video signal;

horizontal low-frequency component suppressing means for suppressing a horizontal low-frequency component of the vertical high-frequency component output from the frequency separating means to produce a vertical-high-frequency, horizontal-high-frequency output;

amplitude converting means for converting the amplitude of the vertical-high-frequency, horizontal-high-frequency output from the horizontal low-frequency component suppressing means; and adding means for adding the vertical low-frequency component output from the frequency separating means and the output of the amplitude converting means.

37. A deflickering device for removing a flicker component from an input video signal, comprising:

first frequency separating means for separating vertical high-frequency and low-frequency components from the input video signal;

second frequency separating means for separating vertical-high-frequency-horizontal-high-frequency and vertical-high-frequency-horizontal-low-frequency components from the vertical high-frequency component of the input video signal;

first direct-current component directing means for detecting a horizontal direct-current component from the input video signal;

first amplitude converting means for converting the amplitude of the vertical-high-frequency-horizontal-low-frequency based on the output of the first direct-current component detecting means; and adding means for adding the vertical low-frequency component separated by said first frequency separating means, the vertical-high-frequency-horizontal-high-frequency component separated by said second frequency separating means, and the output of said first amplitude converting means, wherein when the amplitude of the vertical-high-frequency-horizontal-low-frequency component is converted at the first amplitude converting means, if the direct-current component is detected by said first direct-current component detecting means, a reverse characteristics of the vertical-high-frequency-horizontal-low-frequency is given.

38. A deflickering device for removing a flicker component from an input video signal, comprising:

first frequency separating means for separating vertical high-frequency and low-frequency components from the input video signal;

first direct-current component detecting means for detecting a horizontal direct-current component from the input video signal;

first amplitude converting means for converting the amplitude of the vertical high-frequency component based on the output of the first direct-current component detecting means;

adding means for adding the vertical low-frequency component separated by said first frequency separating means, and the output of said first amplitude converting means, wherein when the amplitude of the vertical high-frequency component is converted at the first amplitude converting means, if the direct-current component is detected by said first direct-current component detecting means, a reverse characteristics of the vertical high-frequency is given.

39. The deflickering device according to claim 37, wherein when the horizontal direct-current component in the input video signal is detected, the amplitude of the vertical-high-frequency-horizontal-high-frequency component separated at the second frequency separating means is compared with a predetermined value, and said first direct-current component detecting means is so controlled that when the amplitude is less than the predetermined value, said direct-current component is detected.

40. A deflickering device for removing a flicker component from an input video signal including a luminance signal and color difference signals, comprising:

screen enlargement position information generating means for generating horizontal and vertical screen enlargement position information at the time of screen enlargement;

vertical interpolating means, receiving and interpolating pixels in the vertical direction of said luminance signal but not said color difference signals by using adjacent upper or lower pixels based on the vertical screen enlargement position information output from said screen enlargement position information generating means;

horizontal interpolating means for interpolating pixels in the horizontal direction based on the horizontal screen enlargement position information output from said screen enlargement position information generating means;

said vertical interpolating means interpolating pixels by interpolating only said luminance signal thereby limiting the vertical bandwidth of only the luminance signal and not the color difference signals , removing the flicker component of only the luminance signal.

* * * * *

UNITED STATES PATENT AND TRADEMARK OFFICE
CERTIFICATE OF CORRECTION

PATENT NO. : 5,822,008
DATED : October 13, 1998
INVENTOR(S) : Sadayuki Inoue, et al.

Page 1 of 2

It is certified that error appears in the above-indentified patent and that said Letters Patent is hereby corrected as shown below:

On the title page, item [56] insert the following:

U. S. PATENT DOCUMENTS

| EXAMINER INITIAL | | PATENT NUMBER | | | | | | ISSUE DATE | PATENTEE | CLASS | SUBCLASS | FILING DATE IF APPROPRIATE |
|---|---|---|---|---|---|---|---|---|---|---|---|---|
| | | 5 | 1 | 8 | 2 | 6 | 4 | 3 | 01/26/1993 | Futscher | | | |
| | | 4 | 9 | 2 | 4 | 3 | 1 | 5 | 05/08/1990 | Yamashita | | | |
| | | 5 | 0 | 1 | 2 | 3 | 2 | 6 | 04/30/1991 | Sakamoto et al. | | | |
| | | 4 | 6 | 3 | 9 | 7 | 6 | 3 | 01/27/1987 | Willis et al. | | | |
| | | 4 | 6 | 0 | 2 | 2 | 7 | 3 | 07/22/1986 | Carlson | | | |
| | | | | | | | | | | | | | |
| | | | | | | | | | | | | | |
| | | | | | | | | | | | | | |

UNITED STATES PATENT AND TRADEMARK OFFICE
CERTIFICATE OF CORRECTION

PATENT NO. : 5,822,008
DATED : October 13, 1998
INVENTOR(S) : Sadayuki Inoue, et al.

It is certified that error appears in the above-indentified patent and that said Letters Patent is hereby corrected as shown below:

FOREIGN PATENT OR PUBLISHED FOREIGN PATENT APPLICATION

| | | DOCUMENT NUMBER | | | | | | | PUBLICATION DATE | COUNTRY OR PATENT OFFICE | CLASS | SUBCLASS | TRANSLATION YES | NO |
|---|---|---|---|---|---|---|---|---|---|---|---|---|---|---|
| | 3 - | 3 | 2 | 2 | 0 | 9 | 9 0 | A | 09/30/1991 | Japan | | | | |
| | WO | 94 | 1 | 1 | 8 | 5 | 4 | | 05/26/1994 | PCT | | | | |
| | 2 | 1 | 8 | 1 | 3 | 2 | 3 | A | 04/15/1987 | Great Britain | | | | |
| | 0 | 6 | 5 | 1 | 5 | 6 | 8 | A2 | 05/03/1995 | EPO | | | | |
| | 7 - | 0 | 3 | 0 | 8 | 6 | 7 | A | 01/31/1995 | Japan | | | | |

Signed and Sealed this

Second Day of November, 1999

Attest:

Q. TODD DICKINSON

Attesting Officer

Acting Commissioner of Patents and Trademarks